US012602299B2

(12) United States Patent
Zhou et al.

(10) Patent No.: US 12,602,299 B2
(45) Date of Patent: Apr. 14, 2026

(54) RUNTIME SPARING FOR UNCORRECTABLE ERRORS BASED ON FAULT-AWARE ANALYSIS

(71) Applicant: Intel Corporation, Santa Clara, CA (US)

(72) Inventors: Shen Zhou, Shanghai (CN); Cong Li, Shanghai (CN); Tai Huang, Shanghai (CN); Kuljit S. Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 17/865,095

(22) Filed: Jul. 14, 2022

(65) Prior Publication Data

US 2022/0350715 A1 Nov. 3, 2022

(30) Foreign Application Priority Data

Jun. 14, 2022 (WO) ................ PCT/CN2022/098507

(51) Int. Cl.
*G06F 11/20* (2006.01)
(52) U.S. Cl.
CPC ...... *G06F 11/2056* (2013.01); *G06F 11/2094* (2013.01); *G06F 2201/805* (2013.01)
(58) Field of Classification Search
CPC ............ G06F 11/1048; G06F 11/1666; G06F 11/2056; G06F 11/2094; G11C 29/4401; G11C 29/52; G11C 29/74
See application file for complete search history.

(56) References Cited

U.S. PATENT DOCUMENTS

| | | | |
|---|---|---|---|
| 8,195,891 B2 | 6/2012 | Trika | |
| 8,839,032 B2 | 9/2014 | Walton et al. | |
| 10,262,754 B2 * | 4/2019 | Cheriton | ............. G06F 11/1068 |
| 10,579,464 B2 | 3/2020 | Das et al. | |
| 11,281,277 B2 | 3/2022 | Chen et al. | |
| 2015/0006993 A1 * | 1/2015 | Vogt | .................... G06F 11/1052 |
| | | | 714/763 |

(Continued)

OTHER PUBLICATIONS

Du et al., "Predicting Uncorrectable Memory Errors from the Correctable Error History: No Free Predictors in the Field", Sep. 27-30, 2021, Proceedings of the International Symposium on Memory Systems (MEMSYS '21), Association for Computing Machinery, pp. 1-10. (Year: 2021).*

(Continued)

*Primary Examiner* — Michael Maskulinski
(74) *Attorney, Agent, or Firm* — Compass IP Law PC

(57) ABSTRACT

A system can respond to detection or prediction of an uncorrectable error (UE) in memory based on fault-aware analysis. The fault-aware analysis enables the system to generate a determination of a specific hardware element of the memory that is faulty. In response to detection of an error, the system can correlate a hardware configuration of the memory device with historical data indicating memory faults for hardware elements of the hardware configuration. Based on a determination of the specific component that likely caused the UE, the system can identify a region of memory associated with the detected UE and mirror the faulty region to a reserved memory space of the memory device for access to data of the faulty region.

16 Claims, 14 Drawing Sheets

(56)            References Cited

U.S. PATENT DOCUMENTS

| | | | |
|---|---|---|---|
| 2015/0318627 A1* | 11/2015 | Berry, Jr. ............ | G06F 11/2094 |
| | | | 714/6.32 |
| 2018/0246794 A1* | 8/2018 | Baty ................... | G06F 11/0727 |
| 2022/0050603 A1 | 2/2022 | Zhou et al. | |
| 2022/0350715 A1 | 11/2022 | Zhou et al. | |
| 2023/0083193 A1 | 3/2023 | Zhou et al. | |

OTHER PUBLICATIONS

Du et al., "Predicting uncorrectable memory errors for proactive replacement: An empirical study on large-scale field data", 2020, IEEE, 16th European Dependable Computing Conference (EDCC), pp. 41-46 (Year: 2020).*

* cited by examiner

DRAM RANK 430

CMD BUS 432

ADDR BUS 434

CHIP [0]    CHIP [1]    • • •    CHIP [M-1]

DATA BUS 436

400

DRAM CHIP 410

BANK[N-1]

BANK[...]

BANK[0]

BL

BL PRECHARGE 424

BITCELL 420

SEL LINE

CMD BUS 432

CMD DEC 412

ROW DEC 422

• • •
• • •
• • •
• • •
• • •

WL

ROW ADDR

ADDR BUS 434

ROW BUFFER 426

COL ADDR

COLUMN DEC 428

DATA BUS 436

702

704

RUNTIME SPARING FOR UNCORRECTABLE ERRORS BASED ON FAULT-AWARE ANALYSIS

RELATED APPLICATION

This application claims the benefit of priority to Patent Cooperation Treaty (PCT) Application No. PCT/CN2022/098507, filed Jun. 14, 2022. The entire content of that application is incorporated by reference.

FIELD

Descriptions are generally related to memory systems, and more particular descriptions are related to offlining based on detection of uncorrectable errors.

BACKGROUND

Memory failure is among the leading causes of server failure and associated downtime in datacenters. Memory errors can be classified as correctable error (CE) or uncorrectable error (UE). CEs refer to errors within the memory device data that can be corrected with the application of error correction code (ECC). It will be understood that ECC can refer to the error correction codes or to the process of error checking and correction. UEs refer to errors that cannot reasonably be corrected with the application of ECC, and result in system failure. Detected (or detectable) uncorrectable errors (DUEs) refer to UEs that can be detected by the ECC but are not correctable with the ECC.

UEs and DUEs in memory modules pose a significant cost to consumers and manufacturers, which increases when the error is in a high bandwidth memory (HBM) embedded in a processor, since the entire processor system on a chip (SOC) becomes non-functional due to the memory error. Traditional mechanisms to address UEs and DUEs to maintain the system operational include sparing operations and memory mirroring, which allow on-the-fly failover from a failing component to another component.

Sparing generally refers to allocating a portion of memory as a spare space, which is not accessible to the operating system (OS). When an error occurs in the memory space accessible to the OS, the system maps the failed region to the spare space. Sparing can be performed at the level of row, bank, and partial cacheline. However, these sparing techniques are "blind" in that they map out a memory resource due to an error without details of what component failed to cause the error. Thus, sparing tends to be too wasteful by mapping out more resources needed, or else it can be insufficient to address the underlying cause of the error.

Memory mirroring generally refers to replicating write transactions to two separate memory locations. Thus, when an error is detected in a memory read, the failover can simply read the data from the redundant copy. Mirroring can be implemented as full memory mirroring of an entire memory, or can be implemented as address range mirroring, which mirrors only a portion of the full memory space. Full memory mirroring results in only half the memory capacity being available to the OS. Address range mirroring requires only a redundant space for the address range used, which is still a significant resource cost. Address range mirroring can only provide failover protection for data stored within the preconfigured mirrored memory range.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
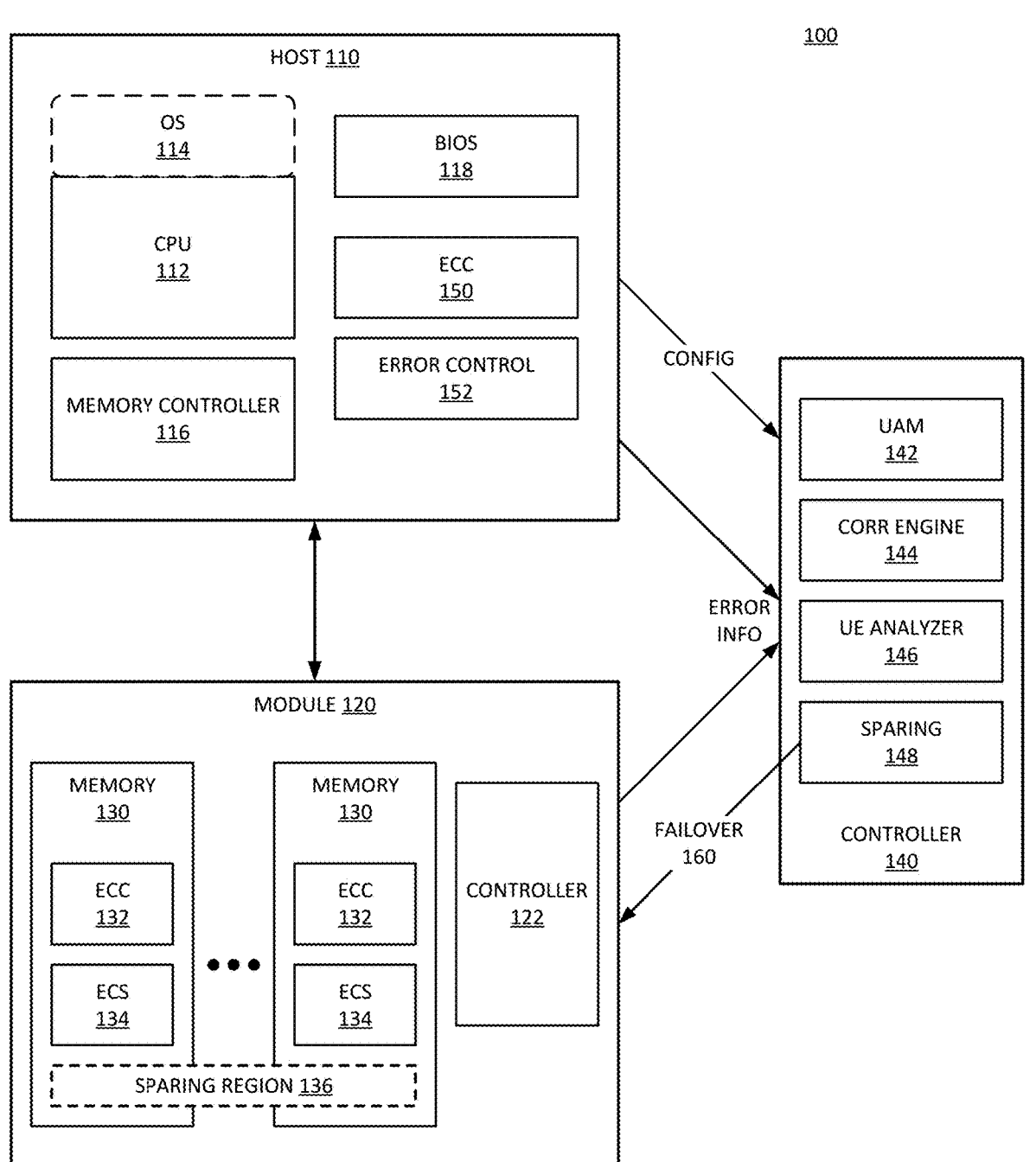
FIG. 1 is a block diagram of an example of a system with fault-aware sparing.

Descriptions of certain details and implementations follow, including non-limiting descriptions of the figures, which may depict some or all examples, and well as other potential implementations.

DETAILED DESCRIPTION

As described herein, a system can respond to detection of an error in memory based on fault-aware analysis. The fault-aware analysis enables the system to determine, such as through a statistical prediction, a specific hardware element of the memory that caused the error, identifying a faulty component and a faulty memory region associated with the faulty component. In statistical analysis, a "prediction" can refer to a conclusion reached by computational analysis. In a computational sense, a computed prediction can identify a prior event or prior cause. The prediction as described herein can refer to a future prediction of a component that is likely to cause an uncorrectable error (UE) or a determination of a cause at the component level of a component that generated a UE. Thus, the system can prevent the occurrence of a UE, or can provide a correction action in response to detection of a UE.

In the descriptions below, the computation is generally referred to as fault analysis. A system with fault analysis or fault-aware analysis can account for the circuit-level architecture of the memory rather than the mere number or frequency of correctable errors (CEs). Observation of error patterns related to circuit structure can enable the system to predict with confidence the component that is the source of the error. A fault prediction for a detected UE or predicted UE can refer to the result of a computational analysis that identifies a most likely cause of an error that occurred prior in time (i.e., for a detected UE) or for a UE that is expected to occur (i.e., predicted UE).

In response to an error, the system can correlate a hardware configuration of the memory device with historical data indicating memory faults for hardware elements of the hardware configuration. Thus, the system can account for rank, bank, row, column, or other information related to the physical organization and structure of the memory in predicting uncorrectable errors. Based on a determination of the specific component that caused a detected error (whether a CE or a UE), the system can identify a region of memory associated with the detected error and mirror the faulty region to a reserved memory space of the memory device for access to the data that was stored in the faulty region.

A runtime micro-level-fault-aware policy based on tracking error history can detect defective memory regions (e.g., worldline, bitline/DQ (data pin), subrange of wordline/bitline, row, column, device, rank) to infer whether a certain microlevel memory component (e.g., column, row) is faulty. The analysis of faulty components can occur with hardware on the system platform. The system can provide an operating system (OS) agnostic runtime sparing mechanism at the cacheline granularity with awareness of underlying memory fault patterns and in-field configurable sparing capacity.

Depending on whether a subset of the cacheline falls into an identified defective region or not, the memory controller can perform runtime decisions to mirror the data to a spare region during writing. When a UE occurs during a cacheline read, the memory controller can read the data replica from the sparing memory if the copy has been stored previously. The analysis can apply to memory modules such as dual inline memory modules (DIMMs) as well as embedded high bandwidth memory (HBM) system on a chip (SOC) packages.

FIG. 1 is a block diagram of an example of a system with fault-aware sparing.

System 100 illustrates memory coupled to a host. Host 110 represents a host computing platform, such as an SOC (system on a chip). Host 110 includes host processing elements (e.g., processor cores) represented by CPU (central processing unit) 112 to execute operations, and memory controller 116 to manage access to memory 130. Host 110 includes hardware interconnects and driver/receiver hardware to provide the interconnection between host 110 and module 120, which can be a DIMM. In one example, memory 130 represents an HBM, which refers to a chip or package that includes a stack or a group of tiles of memory dies.

Reference to the following descriptions of memory 130 in module 120 can apply to dynamic random access memory (DRAM) chips or DRAM devices in a DIMM or in an HBM package or an HBM device with multiple DRAM chips in a vertical stack. In one example, memory 130 represents double data rate (DDR) DRAM devices. In one example, memory 130 represents graphics memory, which can be installed on a graphics memory module, or can be mounted on a graphics processing unit (GPU).

Host 110 includes OS (operating system) 114, which executes on CPU 112. OS 114 represents a software platform for system 100. Software programs and processes can execute under OS 114. OS 114 manages memory for software programs that execute on CPU 112.

Module 120 includes memory 130, which represents parallel memory resources coupled to host 110, such as multiple DRAM devices. Module 120 includes controller 122, which represent control logic of module 120. In one example, controller 122 is, or is part of, control logic that manages the transfer of commands and data on module 120. For example, controller 122 can be part of a registering clock driver (RCD), a control tile, or other control logic on module 120. In one example, controller 122 is a separate controller from an RCD or control logic of a control tile.

In one example, memory 130 includes error checking and correction (ECC) 132, which represents on-die ECC, or logic/circuitry on the memory device to perform error correction for data exchange with host 110. In one example, memory 130 includes error checking and scrubbing (ECS) 134. ECS 134 represents logic/circuitry on-die on memory 130 to perform periodic error scrubbing of data stored on the memory and can be referred to as a scrubbing engine. Error scrubbing refers to detecting errors, correcting the errors, and writing the corrected data back to the memory array. In one example, memory 130 can detect errors in memory based on ECC 132 and ECS 134.

Host 110 includes memory controller 116, which manages host access to memory 130. In one example, memory controller 116 represents an integrated memory controller (iMC) integrated with CPU 112. Alternatively, memory controller 116 can be implemented as a component separate from CPU 112.

Host 110 includes ECC 150, which can be part of memory controller 116. In one example, host 110 includes error control 152, which can also be part of memory controller 116. In one example, error control 152 includes a scrubbing engine on the host to perform patrol scrubbing to detect and report errors detected in memory. In one example, error control 152 can manage error correction actions to perform on memory 130 in response to detection of an error, such as a UE.

Memory controller 116 performs system-level ECC on data from multiple memory devices 130 in parallel, while ECC 132 performs ECC for a single device based on local data. On-die ECC 132 or ECC logic on controller 122 can enable error correction prior to sending data to host 110. In one example, ECS 134 uses ECC 132 to perform error scrubbing. Memory controller 116 can utilize ECC 150 to perform system-level ECC on the data, and the operation of ECC 150 is separate from ECC 132.

ECS 134 or a scrub engine of error control 152 can perform patrol scrubbing, which refers to performance of error checking and scrubbing of all memory 130 within a set period, such as scrubbing the entire memory every 24 hours. Patrol scrubbing can generate CE and UE information during the scrub to indicate correctable errors and hard faults or uncorrectable errors detected in memory 130. Such information can be referred to as a historical error information. When a scrubbing engine detects an error in data of memory 130, in one example, the scrubbing engine provides information to memory controller 116, which can record the data to use for fault analysis.

In one example, system 100 includes controller 140. In one example, controller 140 is part of controller hardware of a hardware platform of system 100 or host hardware platform. For example, controller 140 can be part of the system board chipset, such as the control circuitry of a system board or motherboard. In one example, controller 140 is part of controller 122. In one example, controller 140 is part of memory controller 116. Controller 140 provides fault-aware analysis of UEs and generates information used to perform corrective action. Controller 140 is coupled to module 120 and to memory 130 to provide fault analysis and failover sparing and mirroring.

In one example, controller 140 represents a fault analysis engine implemented in a microcontroller on a system board. In one example, the microcontroller is a dedicated controller for error management. In one example, the microcontroller is part of system board control hardware, and controller 140 can be implemented as firmware on the microcontroller. Thus, a microcontroller that executes controller 140 can also perform other operations.

In one example, controller 140 includes uncorrectable error analysis model (UAM) 142 and correlation (CORR) engine 144. UAM 142 can represent a model of expected error conditions based on patterns of correctable errors detected in memory data. UAM 142 can be referred to as a failure prediction model or a failure analysis model for the memory. The patterns of correctable errors refer specifically to patterns of errors based on patterns of errors with respect to hardware or memory architecture. Correlation engine 144 can correlate detected errors in historical data with hardware configuration information to identify patterns that are indicative of a high likelihood of uncorrectable error. Correlation engine 144 can correlate historical error information, both recently detected errors and patterns of errors (e.g., based on UAM 142).

In one example, host 110 provides configuration information (CONFIG) to controller 140 to indicate hardware information. In addition to memory hardware information, in one example, the configuration information can include information about the processor, operating system, peripheral features and peripheral controls, or other system configuration information. In one example, memory 130 provide correctable error information (ERROR INFO) to controller 140 to indicate detection of CEs and UEs, to indicate when and where CEs and UEs have occurred. In one example, host 110 provides error information to controller 140 to indicate detection of CEs and UEs in memory 130. In one example, correlation engine 144 correlates the error information, including information about when and where errors have occurred within the memory structure, with configuration information, such as memory configuration and system platform configuration.

In one example, controller 140 correlates detected errors with hardware configuration information for module 120 and memory 130. Such information can be referred to as the memory hardware configuration. In one example, controller 140 correlated detected errors with hardware configuration information for the computer system, which can include memory hardware configuration as well as hardware, software, and firmware configuration of one or more components of the system board or the host hardware platform. The host hardware platform can refer to the configuration of the host processor and other hardware components that enable operation of the computer system. The software or firmware configuration of a system can be included with hardware configuration information to the extent that the software configuration of the hardware causes the same hardware to operate in different ways.

In one example, controller 140 includes UE analyzer 146. UE analyzer 146 represents logic/circuitry within controller 140 to determine a specific hardware component of memory that caused a detected UE or DUE. In one example, UE analyzer 146 operates after detection of a UE. UE analyzer 146 can use information from UAM 142 and correlation engine 144 to compute a confidence level for multiple hardware components of memory, based on historical error information correlated with the hardware configuration information. The confidence level can indicate a likelihood that a specific component caused a detected UE. The operation of UE analyzer 146 can be considered a prediction in that it determines or predicts based on statistical analysis which component is most likely to have caused the UE.

For example, UE analyzer 146 can compute confidence factors for multiple or all hardware component levels of the hardware architecture and determine that the component with a highest (or lowest, depending how the calculation is performed) score is the cause of the fault. In one example, UE analyzer 146 determines one component is the cause of the fault only if its confidence score exceeds all other confidence scores by a threshold. In the case of more than one confidence score within a threshold of each other, UE analyzer 146 can generate an indication that a determination cannot be made (e.g., an "unknown component failure").

In one example, memory 130 includes one or more mechanisms to avoid a portion of memory with a fault, which can be triggered for failover 160. In one example, memory 130 can perform sparing in response to detection of a UE. In one example, memory 130 can perform sparing in response to detection of a pattern of errors expected to result in a UE. Sparing refers to memory 130 mapping a spare row or portion of a row to an address of a row or portion with an uncorrectable error. The sparing can be soft sparing, to temporarily make the mapping, which will remain until the memory is rebooted. The sparing can be hard sparing, setting fuses to permanently remap the address. The sparing can be an entire row or partial row sparing.

In a traditional system, BIOS 118 would perform in-field repair actions based on simple error observations or indicators. In one example of system 100, error control 152 can be part of BIOS 118 to provide fault-aware application of corrective actions. In one example, controller 140 can be part of BIOS 118 to provide the fault-aware analysis.

In one example, memory 130 includes sparing region 136, which represents a portion of memory that is allocated for sparing and mirroring operations. Sparing region 136 can include a region or an address range of physical memory capacity in each memory device. In one example, one or more memory devices of the group or plurality of memory devices includes a sparing region. BIOS 118 can reserve or allocate sparing region 136 and manage the use of the spare capacity.

Sparing and mirroring in system 100 can provide on-the-fly failover from a failing component to a spare memory resource. In contrast to traditional sparing and mirroring techniques, system 100 can provide sparing and mirroring based on fault-aware analysis of the underlying cause of a UE or predicted UE. The fault-aware analysis of system 100 can be accompanied by runtime sparing failover. Thus, system 100 can provide mirroring to a spare memory resource in response to a detected error, without needing reboot to implement the failover to the spare region or spare component. Knowledge of the cause of the error can enable system 100 to perform sparing that is specific to the failure, with runtime implementation of the mirroring to the spare capacity. System 100 can provide runtime defective row sparing as well as boot time defective row sparing.

In the past, row sparing has been performed via post package repair (PPR), where a system detects a row of memory having a defect (i.e., one or more defective bits), and blows a fuse to map a spare row into the array to replace the defective row. Such a traditional approach to row sparing can be used by a manufacturer prior to deployment of the memory device, or by the host OS during operation. When the fuse is blown, the spare row is mapped into the array to replace the defective row, and the defective row is excluded from the memory array. The row is excluded by making it unavailable for access. The mapping of the spare row causes the physical address of the defective row to be associated with the spare row.

Limitations on traditional row sparing implementations include the fact that the total number of spare rows is fixed and limited in DRAM devices. Row sparing cannot mitigate the memory errors scattered across a large range of rows, such as a bitline/DQ fault or a bank fault. It is easy to run out of spare row capacity when multiple row faults occur. Furthermore, in the past, row sparing has been implemented with a PPR action, which requires a system reboot.

Bank sparing or rank sparing can replace a bank or a rank of memory, which allows the replacement of a portion of a physical chip or a group of chips having hard errors with a spare bank or spare rank. Bank or rank sparing requires replacement of a large region of memory, which can significantly impact total available memory capacity. Prior implementations of bank sparing have the same limitations as traditional row sparing. Furthermore, bank sparing or rank sparing traditionally requires a system reboot.

Traditional partial cacheline sparing (PCLS) statically encodes the locations of faulty nibbles (i.e., parts of a cacheline) into a sparing directory along with the corresponding data content for replacement. PCLS detects single bit or single nibble hard errors within a cacheline and then replaces the entire nibble (e.g., 4-bits) within the spare capacity in the host, such as spare capacity in the memory controller. In the past, PCLS has only been effective for a single bit or single nibble failure, constrained with fixed and limited PCLS capacity in the memory controller.

In the past, memory mirroring significantly reduced the available memory capacity, as half of the total available memory is used as a spare capacity or replica to provide full memory access redundancy coverage. When half the memory is reserved for redundancy, the capacity of user-accessible memory is reduced by half. Memory mirroring traditionally separates memory into two separate channels, where the system copies one channel to another to create redundancy. The memory controller typically manages full mirroring, making it independent of the OS of the host.

Address range mirroring allows the OS to specify a subset of the total available memory for mirroring. Thus, address range mirroring is not OS independent, because it requires the OS to be aware of the mirrored and non-mirrored memory ranges. In the past, the OS locates selected workloads in the mirrored regions, such as kernel space, mission-critical data, or other identified data or code. The OS statically allocates the mirrored and non-mirrored memory ranges per system boot. Thus, address range mirroring is unaware of memory failures that occur during runtime, and is not able to respond to runtime failures.

Again, in contrast to the traditional sparing and mirroring described above, system 100 enables sparing and mirroring with runtime failover. Sparing 148 in controller 140 represents the capability of controller 140 to perform sparing and mirroring actions in response to failure analysis provided by UE analyzer 146. Failover 160 represents runtime failover from a failed resource or memory region to a spare memory region. In one example, sparing 148 identifies a faulty region of memory associated with the faulty component or fault region prediction generated by UE analyzer 146. Failover 160 can represent sparing 148 mirroring the faulty region at runtime to a reserved memory space of memory 130 (e.g., sparing region 136) for access to the faulty region, or to the data from the faulty region.

The mirroring of failover 160 is flexible in terms of granularity to accommodate different regions of failure. In one example, sparing 148 performs failover mirroring on a cacheline granularity or at the level of cachelines. The sparing can be a single cacheline or multiple cachelines. Thus, sparing 148 can accommodate defective cachelines, rows, and banks with failover 160 based on an understanding of the region of memory that failed. Sparing 148 can perform sparing actions at runtime that are configurable based on system setup. In one example, BIOS 118 configures sparing 148 for different mirroring and sparing actions based on a size of memory allocated for sparing region 136, and based on system configuration.

Controller 140 represents hardware in system 100. Sparing 148 can provide runtime sparing that is OS agnostic. Based on an access request (e.g., read or write) to a subset of a cacheline identified as a defective memory region, controller 140 or memory controller 116 (when components of controller 140 are implemented in memory controller 116) can perform a runtime decision, represented as failover 160, to mirror the cacheline to a predefined spare region, represented as sparing region 136. When the memory access is a write operation or write transaction, failover 160 triggers memory 130 to write to the mirror region, as well as the defective region. The write to the defective region will not be successful, but the data should be successfully written to sparing region 136. When the memory access is a read, in one example, in response to an uncorrectable error, memory controller 116 can read the mirrored replica of the cacheline from sparing region 136 and return it to OS 114 or the agent or process that generated the request for data.

In one example, system 100 enables a proactive failover. With a proactive failover, system 100 does not wait for a memory access to a failed region before mirroring the failed region to sparing region 136. Thus, in response to detection of a failure, sparing 148 can set up the mirror to sparing region 136 for the failed region and write the contents of the failed region with the appropriate data. In one example, system 100 enables a lazy failover. A lazy failover refers to system 100 waiting for a write access to the failed region before allocating the mirror region and copying contents to sparing region 136. Thus, with a lazy failover, system 100 can write the data to the mirror region only in response to a request to write the failed region. In one example, for any read requests to the failed region, the failover operation is not triggered, which can avoid additional overhead during the read operation.

Figure 2A:
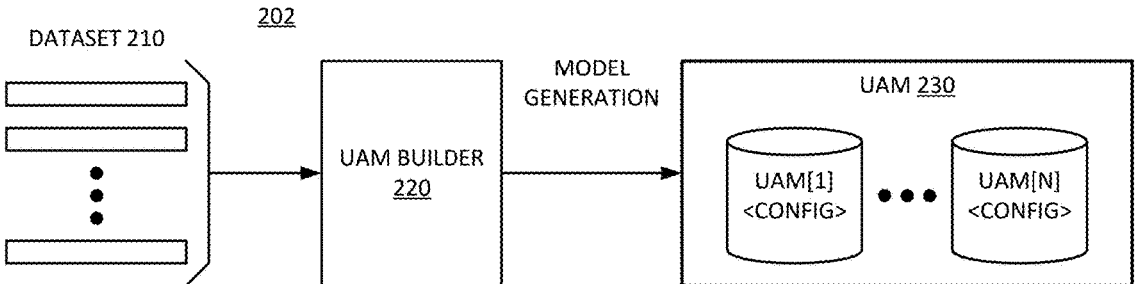
FIG. 2A is a block diagram of an example of uncorrectable error analysis training.

With a proactive failover, system 100 can implement proactive writes to write data to the redundant region for all regions detected. For a proactive read, system 100 can ensure that the redundant regions are allocated and written with appropriate data prior to a read access request. With a lazy write, system 100 can wait until a write request is made, determine that the region is defective, and then allocate the redundant region and write the data to the mirror space FIG. 2A is a block diagram of an example of uncorrectable error analysis training. System 202 represents elements of a training phase or a training system for prediction of memory fault or an analysis of memory fault due to uncorrectable error. System 202 can provide information for an example of UAM 142 of system 100. In one example, system 202 can be considered an offline prediction or analysis model training, in that dataset 210 represents data for past system operations. An online system refers to a system that is currently operational. System 202 is "operational" in the sense that it is operational to generate the model, but generates the model based on historical data rather than realtime or runtime data.

In one example, system 202 includes dataset 210. Dataset 210 can represent a large-scale CE and UE failure dataset that includes microlevel memory error information. The microlevel memory error information can include indications of failure based on bit, DQ row, column, device, rank, channel, DIMM, or other configuration, or a combination of information. In one example, dataset 210 includes a timestamp to indicate when errors occurred. In one example, dataset 210 includes hardware configuration information associated with the error dataset. The hardware configuration information can include information such as memory device information, DIMM manufacturer part number, CPU model number, system board details, or other information, or a combination of such information. In one example, dataset 210 can represent information collected from large-scale datacenter implementations.

System 202 includes UE analysis model (UAM) builder 220 to process data from dataset 210 to generate a model that indicates configurations with error patterns that are likely to result in a UE. In one example, UAM builder 220 represents software logic for AI (artificial intelligence) training to generate the model. In this context, AI represents neural network training or other form of data mining to identify patterns of relationship from large data sets. In one example, UAM builder 220 generates UAM 230 for each hardware configuration, based on microlevel (e.g., bit, DQ, row, column, device, rank) CE patterns or indicators. Thus, UAM 230 can include N different UAMs (UAM[1:N]) based on different configuration information (CONFIG).

In one example, UAM 230 includes a separate analysis model for each combination of a CPU model and a DIMM manufacturer or part number. Such granularity for different combinations of CPU model and DIMM part number can identify fault hardware patterns differently, seeing that the different hardware configurations can cause different hardware fault statuses. For example, DIMMs from the same manufacturer or with the same part number but with a different CPU model may implement ECC differently in the memory controller, causing the same faulty hardware status of a DIMM to exhibit different observations due to a different behavior of ECC implementation. A CPU family may provide multiple ECC patterns, allowing a customer to choose the ECC based on the application the customer selects. Similarly, for the same CPU model with a DIMM from a different manufacturer or with a different part number, the faulty status of a DIMM my exhibit different observations due to the different design and implementation of the DIMM hardware. Thus, in one example, system 202 creates analysis models per combination of CPU model and DIMM manufacture or part number to provide improved analysis accuracy performance.

Figure 2B:
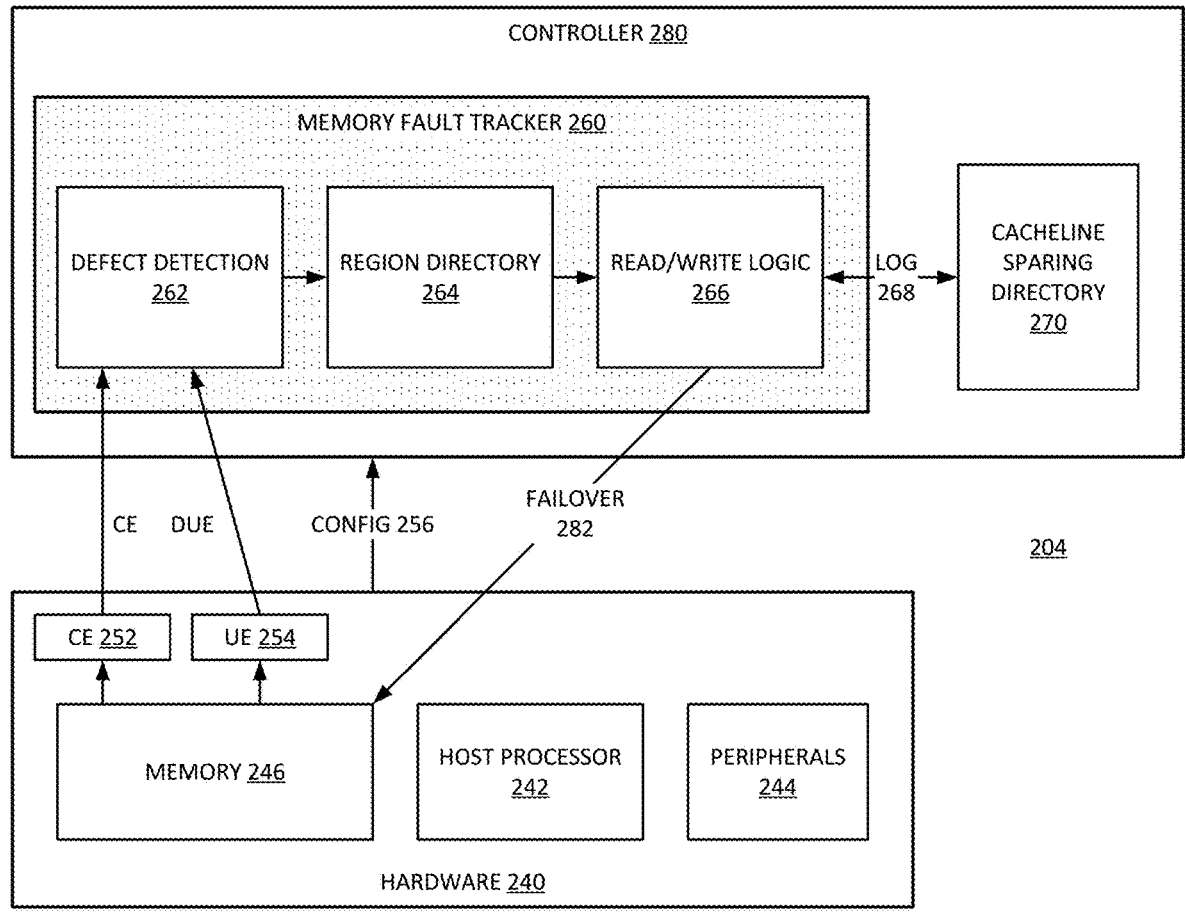
FIG. 2B is a block diagram of an example of sparing based on uncorrectable error analysis.

FIG. 2B is a block diagram of an example of sparing based on uncorrectable error analysis. System 204 represents an example of a system with UE fault analysis in accordance with an example of system 100. In one example, system 204 implements an example of UAM 230 of system 202 in defect detection 262. Whereas system 202 can operate based on historical or stored information, system 204 can be considered a runtime memory failure analysis system in that system 204 operates on runtime or realtime parameters as they occur as well as on historical information.

In one example, system 202 of FIG. 2A provides a machine-learning based uncorrectable memory error analysis mechanism at the level of the memory device. In one example, system 204 utilizes system 202 to generate a runtime prediction or determination of faulty components to determine what component is the likely cause of a detected UE or other error. For example, system 204 can generate a prediction or a determination of a cause of an error and trigger a correction action specific to the cause of the error.

System 204 includes controller 280, which can be a dedicated controller, or can represent firmware to execute on a shared controller or hardware shared with other control or management functions in the computer system. In one example, controller 280 is a controller of a host hardware platform, such as hardware 240. The host hardware platform can include a CPU or other host processor 242. Memory 246 can represent multiple memory device or multiple parallel memory resources. In one example, controller 280 represents a controller disposed on a substrate of a computer system. In one example, the substrate is a motherboard. In one example, the substrate is a memory module board. In one example, the substrate is a logic die of an HBM stack (e.g., a control layer on which the memory dies are disposed).

Controller 280 executes memory fault tracker (MFT) 260, which represents an engine to determine a component that caused an error and trigger runtime sparing action for a memory region associated with the faulty component, in accordance with any example described. Hardware 240 represents the hardware of the system to be monitored for memory errors. Hardware 240 provides hardware configuration (CONFIG) 256 to MFT 260 for error analysis. Configuration 256 represents the specific hardware components and their features and settings. Hardware 240 can include host processor 242, which represents processing resources for a computer system, peripherals 244, and memory 246.

Peripherals 244 represent components and features of hardware 240 that can change the handling of memory errors. Thus, hardware components and software/firmware configuration of the hardware components that can affect how memory errors are handled can be included for consideration in configuration information to send to MFT 260 for memory fault analysis. Examples of peripheral configuration can include peripheral control hub (PCH) configuration, management engine (ME) configuration, quick path interconnect (QPI) capability, or other components or capabilities.

Memory 246 represents the memory resources for which errors can be identified. In one example, system 204 monitors memory 246 to determine when correctable errors and uncorrectable errors occur in the memory. For example, such errors can be detected in a scrubbing operation or as part of an error handling routine. CE 252 represents CE data for correctable errors detected in data of memory 246. UE 254 represents UE data for detected, uncorrectable errors (DUES) detected in data of memory 246.

In one example, defect detection 262 represents a UE analyzer that implements information from UAM 230 to identify a faulty component in memory 246 based on the historical error information correlated with system architecture information. With the identification of an error at the hardware component level, memory fault tracker 260 can specifically identify what memory region(s) are defective based on the faulty component.

Region directory 264 enables memory fault tracker 260 to identify a region of memory associated with the faulty component detected or predicted by defect detection 262. In one example, system 204 stores faulty addresses in a nonvolatile RAM (NVRAM, flash memory, or other persistent memory. Storing the addresses enables system 204 to store sparing information persistently between boots. Certain memory faults will persist across power cycles of system 204.

Region directory 264 can represent a list of defective memory regions with row and column address information. Such a region directory can be referred to as a defective memory region directory (DMRD). In one example, memory fault tracker 260 stores information from region directory 264 in cacheline sparing directory 270 (or simply, directory 270) or other information that stores log 268. Directory 270 can be a nonvolatile memory (NVM) store for data persistence across system power cycles.

In one example, region directory 264 detects whether any location of a cacheline associated with a memory access request falls into an identified defective memory region before writing a cacheline to memory 246 (e.g., the main memory). Read/write logic 266 represents logic or circuitry in memory fault tracker 260 to manage reads and writes to memory 246. In one example, region directory 264 can identify a failed region on a cacheline granularity, with an identified regions being one or multiple cachelines in size. Failover 282 represents sparing or mirroring triggered by controller 280 in response to detection of an error and identification of a memory region associated with the error.

Based on the result of the detection for a write access request, read/write logic 266 can perform either a normal write of the cacheline, or a normal write with an additional mirrored write of the cacheline. Based on the result of the detection for a read access request, read/write logic 266 can perform a read from the main memory space, or perform a read of the cacheline from the sparing memory. The read from the sparing memory can be limited to the situation where a UE occurs and a replica of the cacheline has been stored in the sparing memory.

In one example, during a system reboot, system 204 can reevaluate the defective memory region based on a built-in self-test (BIST), based on other sparing actions executed (such as PPR or bank sparing), or a combination of BIST and other sparing actions. Based on the result of the reevaluation of the memory region previously identified as defective, memory fault tracker 260 can remove spared memory regions from a DMRD or other sparing directory that records a mapping of cachelines mirrored to a reserved sparing memory space.

Figure 3:
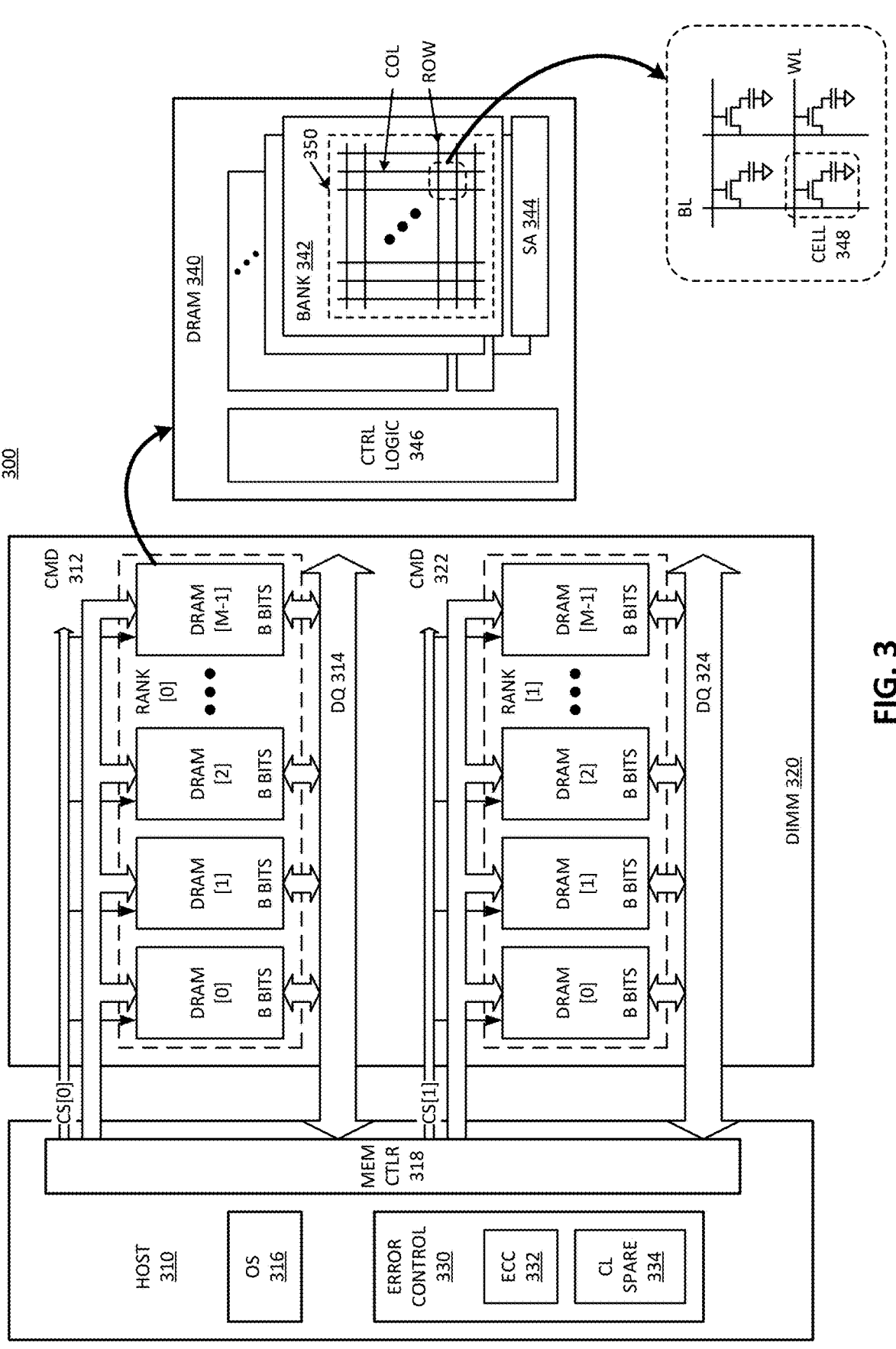
FIG. 3 is a block diagram of an example of a system architecture for fault aware sparing.

FIG. 3 is a block diagram of an example of a system architecture for fault aware sparing. System 300 illustrates a computer system in accordance with an example of system 100 or an example of system 204. System 300 includes host 310 connected to DIMM 320. Host 310 represents the host hardware platform for the system in which DIMM 320 operates. Host 310 includes a host processor (not explicitly shown) to execute operations that request access to memory of DIMM 320.

DIMM 320 includes multiple memory devices identified as DRAM (dynamic random access memory) devices or DRAMs connected in parallel to process access commands. DIMM 320 is more specifically illustrated as a two-rank DIMM, with M DRAMs (DRAM[0:M−1]) in each rank, Rank 0 and Rank 1. M can be any integer. Typically, a rank of DRAMs includes data DRAMs to store user data and ECC DRAMs to store system ECC bits and metadata.

System 300 does not distinguish DRAM purpose. In one example, the DRAM devices of system 300 represents DRAM devices compatible with a double data rate version 5 (DDR5) standard from JEDEC (Joint Electron Device Engineering Council, now the JEDEC Solid State Technology Association).

The DRAMs of a rank share a command bus and chip select signal lines, and have individual data bus interfaces. Command (CMD) 312 represents a command bus for Rank 0 and command (CMD) 322 represents the command bus for Rank 1. The command bus could alternatively be referred to as a command and address bus. CS0 represents a chip select for the devices of Rank 0 and CS1 represents the chip select for the devices of Rank 1. DQ 314 represents the data (DQ) bus for the devices of Rank 0, where each DRAM contributes B bits, where B is an integer, for a total of B*M bits on the DQ bus. DQ 324 represents the data (DQ) bus for the devices of Rank 1.

DRAM 340 provides a representation of an example of details for each DRAM device of system 300. DRAM 340 includes control (CTRL) logic 346, which represents logic to receive and decode commands. Control logic 346 provides internal control signals to respond to commands received on the command bus. DRAM 340 includes multiple banks 342, where the banks represent an organization of the memory array of DRAM 340. Banks 342 have individual access hardware to allow access in parallel or non-blocking access to different banks. The portion labeled as 350 is a subarray of the total memory array of DRAM 340.

The memory array includes rows (ROW) and columns (COL) of memory elements. Sense amplifier (SA) 344 represents a sense amplifier to stage data for a read from the memory array or for a write to the memory array. Data can be selected into the sense amplifiers to allow detection of the value stored in a bit cell or memory cell of the array. The dashed box that includes the intersection of the labeled row and column of the memory array. The dashed portion illustrated a typical DRAM cell 348, including a transistor as a control element and a capacitor as a storage element. Bitline (BL) is the column signal line and wordline (WL) is the row signal line.

Memory controller (MEM CTLR) 318 represents a memory controller that manages access to the memory resources of DIMM 320. Memory controller 318 provides access commands to the memory devices, including sending data for a write command or receiving data for a read command. Memory controller 318 sends command and address information to the DRAM devices and exchanges data bits with the DRAM devices (either to or from, depending on the command type).

Host 310 includes OS 316, which represents a host operating system on host 310. In one example, host 310 includes error control 330 to manage a fault-aware response to UEs (e.g., detected UEs or predicted UEs). In one example, error control 330 includes ECC 332, which represents ECC at host 310. In one example, ECC 332 is part of memory controller 318. Error control 330 can be or include a memory fault tracker. Cacheline (CL) spare 334 represents the ability of error control 330 to track memory errors, determine what component is faulty in response to detection of a UE, identify a memory region associated with the faulty component, and perform a mirroring and sparing action specific to the scope of the faulty component.

Figure 4:
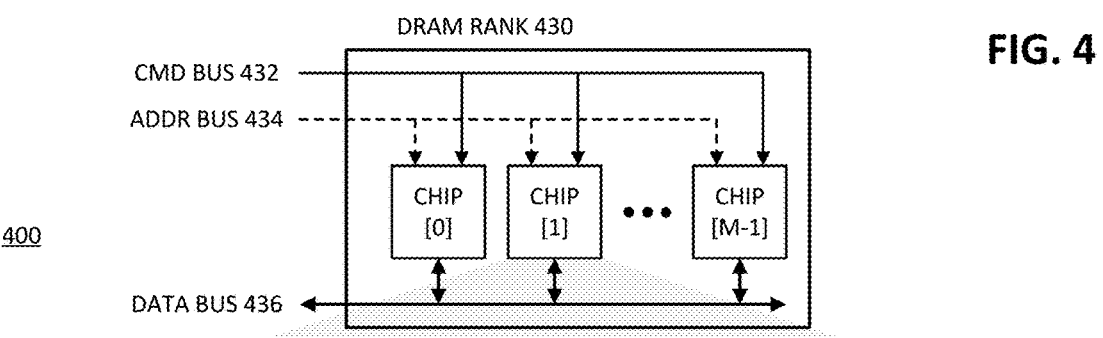
FIG. 4 is a block diagram of an example of a memory bank architecture.

FIG. 4 is a block diagram of an example of a memory bank architecture. System 400 provides an example of a DRAM chip in accordance with an example of system 100 or system 300, where details of the DRAM are illustrated.

Bitcell 420 represents a memory cell or a storage location of the memory array. Bitcell 420 connects to a wordline (WL) and a bitline (BL), with the specific WL/BL location representing an address identifiable by a combination of row (WL) and column (BL) address. The select (SEL) line can enable selection of the wordline.

Row decoder (DEC) 422 represents decoding hardware to select rows or wordlines for read, write, or other access. Row decoder 422 can receive a voltage for a wordline (Vwl) and a voltage for a select line (Vsl) and provide appropriate voltages for selection of a row based on row address (ADDR) information received for an operation.

BL (bitline) precharge 424 represents hardware that can charge one or more selected columns or bitlines for an access operation. BL precharge 424 can charge the bitlines for reading to enable sensing the value stored in a bitcell identified by column and row address. Row buffer 426 represents a buffer for reading or writing bits of the array, and can be implemented as a sense amplifier. Column decoder (DEC) 428 represents hardware to select the output columns or bitlines. Column decoder 428 selects bitlines based on column address information received for an operation.

System 400 represents DRAM rank 430, which includes M DRAM chips, chip[0:(M−1)]. As illustrated, the various DRAM chips share command (CMD) bus 432 and address (ADDR) bus 434. Address bus 434 and command bus 432 are unidirectional buses from the host to the DRAM chips. The DRAM chips also share data bus 436, which is a bidirectional bus to exchange data between the host and the memory.

DRAM chip 410 is illustrated with N banks, Bank[0:(N−1)]. N can be an integer, and is typically a binary number such as 8 or 16. DRAM chip 410 can include command (CMD) decoder (DEC) 412 to decode command information. As illustrated in system 400, the command bus 432 is separate from the address bus 434, although they may be considered a single command and address control bus. They are illustrated as separate in system 400 to indicate that the command and address information can be separated for different controls within the memory device.

Column decoder 428 is shown connecting to data bus 436, to receive data for write operations, and to provide data for read operations. For a write operation, data is received on data bus 436 and placed in row buffer 426 to write to the memory array. For a read operation, data is fetched from the memory array in row buffer 426, to be provided out data bus 436 to the host.

System 400 illustrates the architecture of a DRAM device. Errors can occur in a column along a bitline, in a row along a wordline, at a specific bit (stuck bit), or at multiple locations rendering a bank defective. A memory fault tracker can monitor the specific architectural components of DRAM chip 410 and determine a correction when a UE is detected.

FIGS. 5A-5D represent examples of analysis of a specific hardware element cause of a detected uncorrectable error. The various fault examples illustrate UE cause identification and post-UE health assessment examples for an HBM memory such as the memory stack in system 1000, or for a memory module such as the DIMM in system 300.

Figure 5A:
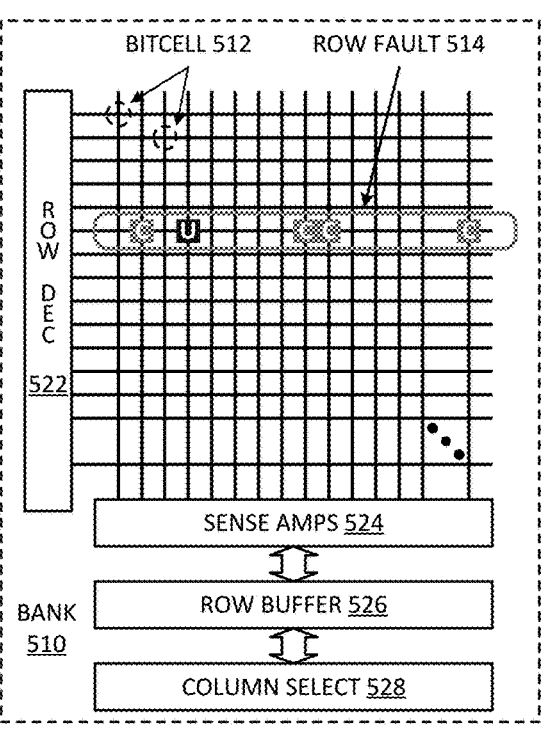
FIGS. 5A-5D represent examples of analysis of a specific hardware element cause of a detected uncorrectable error.

FIG. 5A represents an example of row fault detection. Bank 510 includes row decoder (DEC) 522 to control the selection of rows or wordlines. Bank 510 includes sense amps 524 to stage data for the memory array of bitcells 512, row buffer 526 to buffer the data between the sense amps and the output hardware, and column select 528 to select portions of the row that will be accessed.

Bank 510 represents a memory bank that includes many CEs, illustrated by the gray squares with a 'C' at various bitcells 512. It can be observed that bank 510 includes many CEs in a single row (wordline) of the memory array. It will be understood that not every CE is present at the same time for bank 510. Rather, the CEs illustrated can be detected over time, across multiple accesses of bank 510. Based on the occurrence of multiple CEs in the same row, the system can make a computational determination that the row is faulty. At some point after the occurrence of multiple CEs, the UE is detected on the row, represented by the black square with the 'U'.

In one example, to infer row fault 514 or a wordline fault, a fault analyzer (not specifically illustrated) can track the number of unique locations with errors observed in a row and the minimum range that covers those unique locations. The locations can be identified by a maximum bitline index and minimum bitline index with errors observed. In one example, when the unique error location or minimum errors range (or a combination of the two) reach a threshold that defines a faulty row, the fault analyzer identifies the row as a faulty row. In one example, when a row is determined faulty, the system can track the row address in a defective memory region directory.

Figure 5B:
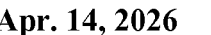
Figure 5B:
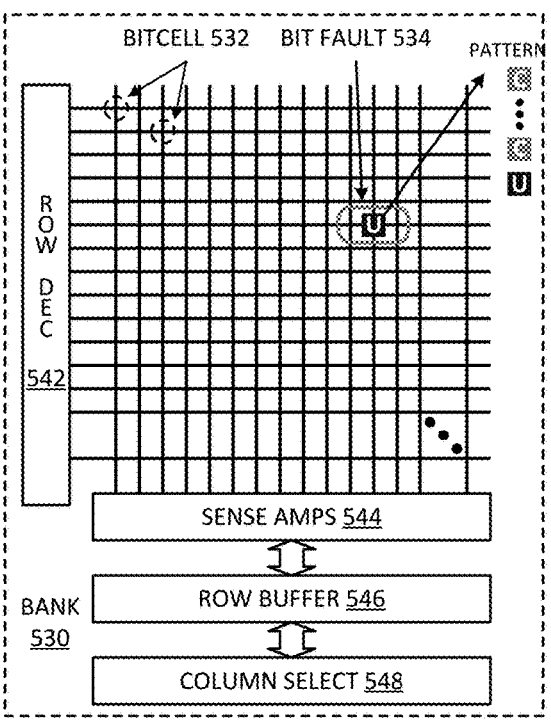

FIG. 5B represents an example of cacheline address fault detection. Bank 530 includes row decoder (DEC) 542 to control the selection of rows or wordlines. Bank 530 includes sense amps 544 to stage data for the memory array of bitcells 532, row buffer 546 to buffer the data between the sense amps and the output hardware, and column select 548 to select portions of the row that will be accessed.

Bank 530 represents a memory bank for which multiple CEs have been detected over time at a specific address. Thus, bank 530 has a pattern of failure at the specific address, with multiple CEs over time (illustrated by the gray squares with a 'C'), followed by a UE (the black square with a 'U') at the same address.

In one example, the address granularity of the detected address fault is a cacheline size. Thus, bank 530 can represent a cacheline fault or a stuck bit fault. Based on repeated CEs at the same address followed by the UE at the address, the fault analyzer can determine with high confidence that the memory address is faulty.

In one example, to infer bit fault 534, which could alternatively be referred to as a bit fault or a single cacheline fault and which represents the error caused by the stuck bit, the faulty analyzer can track the number of errors observed in a specific cell or data unit. When the number of errors reaches a threshold that defines a faulty cacheline, the fault analyzer identifies the cell or data unit as faulty. In one example, the system tracks the subrange of the row containing the faulty cell or the faulty data unit in a defective memory region directory.

Figure 5C:
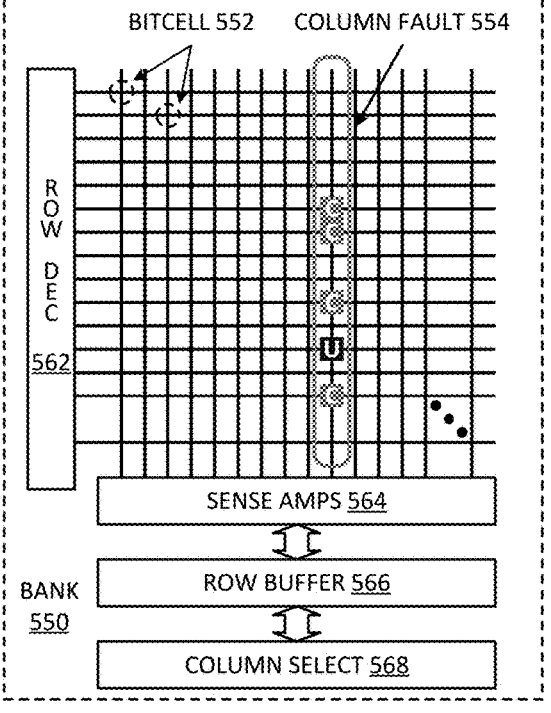

FIG. 5C represents an example of column fault detection. Bank 550 includes row decoder (DEC) 562 to control the selection of rows or wordlines. Bank 550 includes sense amps 564 to stage data for the memory array of bitcells 552, row buffer 566 to buffer the data between the sense amps and the output hardware, and column select 568 to select portions of the row that will be accessed.

Bank 550 represents a memory bank that includes many CEs, illustrated by the gray squares with a 'C' at various bitcells 552. It can be observed that bank 550 includes many CEs in a single column (bitline) of the memory array. It will be understood that not every CE is present at the same time for bank 550. Rather, the CEs illustrated can be detected over time, across multiple accesses of bank 550. Based on the occurrence of multiple CEs in the same column, the system can make a computational determination that the column is faulty. At some point after the occurrence of multiple CEs, the UE is detected on the column (the black square with a 'U'). Given that the MFT engine has observed multiple faults in the column, it can determine that the UE is caused by the column fault. Thus, for bank 550, the MFT engine can detect column fault 554.

In one example, to infer column fault 554 or a bitline/DQ fault, the fault analyzer can track the number of unique locations with errors observed in a column and the minimum range that covers those unique locations. The locations can be identified by a maximum wordline index and a minimum wordline index where errors are observed. When the unique error location or minimum errors range (or a combination of the two) reach a threshold that defines a faulty column, the fault analyzer identifies the column as a faulty column. In one example, when a column is determined faulty, the system can track the column address in a defective memory region directory.

Figure 5D:
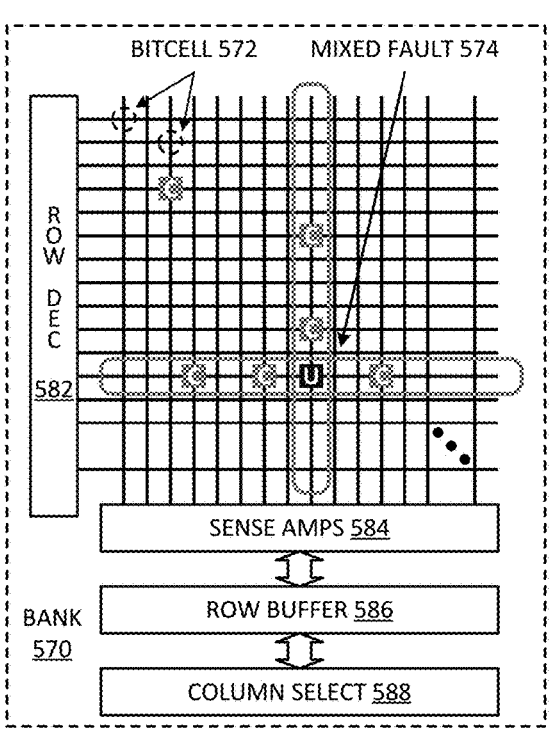

FIG. 5D represents an example of mixed fault detection. Bank 570 includes row decoder (DEC) 582 to control the selection of rows or wordlines. Bank 570 includes sense amps 584 to stage data for the memory array of bitcells 572, row buffer 586 to buffer the data between the sense amps and the output hardware, and column select 588 to select portions of the row that will be accessed.

Bank 570 represents a memory bank that includes many CEs, illustrated by the gray squares with a 'C' at various bitcells 572. It can be observed that bank 570 includes many CEs in a single column (bitline) of the memory array, as well as in a single row (wordline) of the memory array. Even if not every CE is present at the same time for bank 570, the detection of the various CEs over time predicts a potential fault in the column as well as a potential column in the row. At some point after the occurrence of multiple CEs, the UE is detected on the column (the black square with a 'U'). The fault analyzer can identify mixed fault 574 for bank 570 based on detection of a row fault and a column fault for the same bank.

Figure 6:
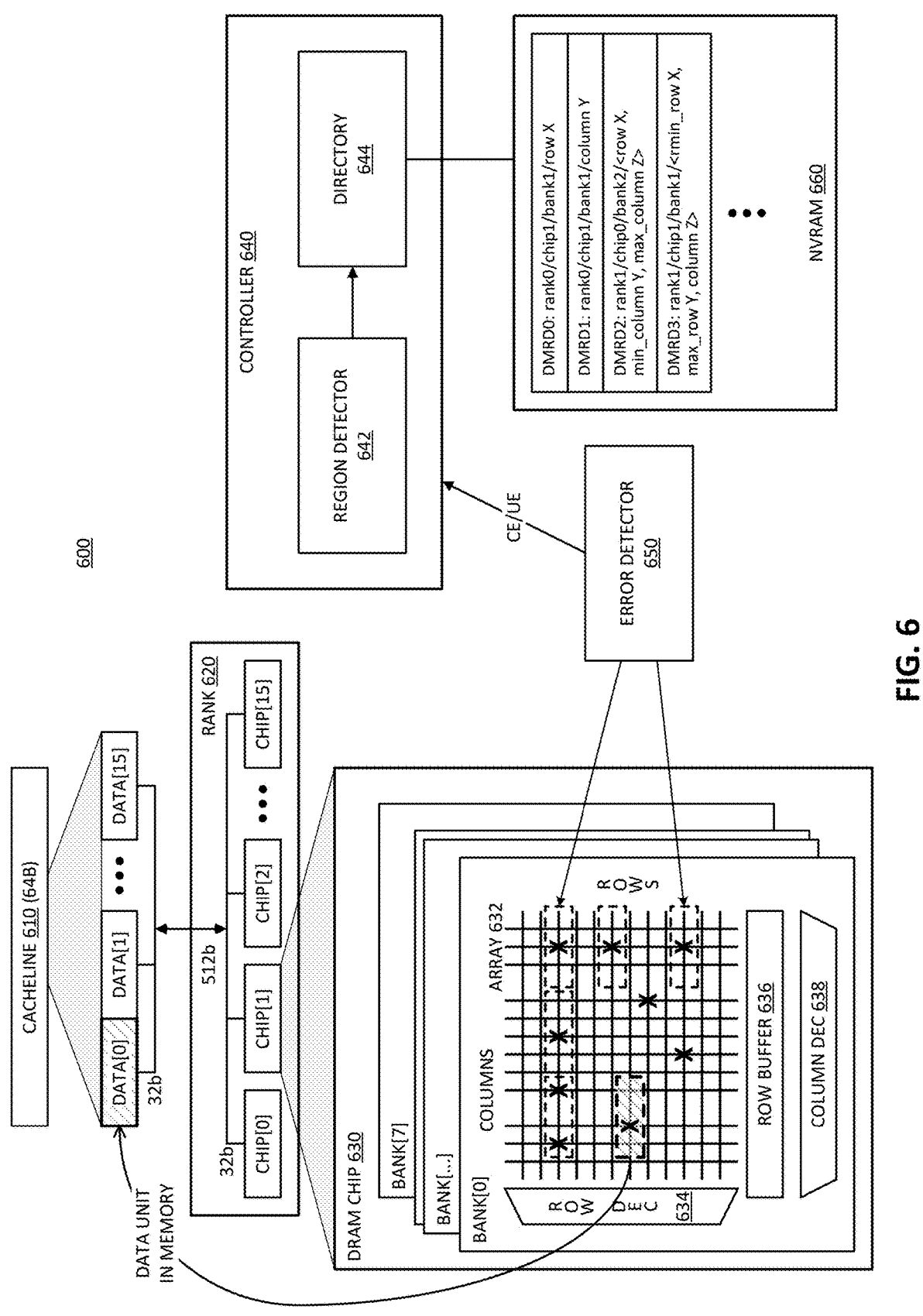
FIG. 6 is a block diagram of an example of a system in which a controller maintains a defective memory region directory.

FIG. 6 is a block diagram of an example of a system in which a controller maintains a defective memory region directory. System 600 represents a system in accordance with an example of system 100, an example of system 204, or an example of system 300.

System 600 illustrates rank 620, with 16 DRAM chips, chip[0:15], that are selected with a common chip select (CS) signal. For cacheline 610 with 64 Bytes of data, there can be 16 data units, data[0:15], which each include 32 bits. System 600 spreads the 64B or 512 bits across the data units, with 32$b$ to each data unit.

DRAM chip 630 represents one of the chips of rank 620. Specifically, DRAM chip 630 shows the details of chip[1], where the other chips will have similar details. DRAM chip 630 includes 8 banks, bank[0:7]. Each bank includes array 632, with columns and rows. Row decoder (DEC) 634 selects the rows or wordlines, and column decoder (DEC) 638 selects the columns or bitlines. Row buffer 636 represents a buffer for data read from a single row. Column decoder 638 can select which portion(s) of the row to trigger for access.

The dashed boxes in array 632 represent data units in memory. The intersection of a column line with a row line represents a memory cell. The memory cells marked with 'X' represent bit errors at those memory cells. Error detector 650 represents hardware in system 600 to detect errors in array 632. In one example, error detector 650 detects both correctable errors and uncorrectable errors in array 632. A correctable error can refer to a row having a single error, which can be corrected by on-die ECC. An uncorrectable error can refer to a row having more than one error, which is generally not correctable by on-die ECC. The arrows from error detector 650 to array 632 identifies two rows having uncorrectable errors. The other errors are correctable errors.

Error detector 650 can provide CE and UE information to controller 640, which represents a controller in accordance with an example of controller 140 of system 100 or an example of controller 280 of system 204. Controller 640 can include region detector 642 to identify a defective memory region associated with detected errors. Controller 640 can include directory 644 as a defective memory region directory (DMRD) to identify regions detected by region detector 642.

Controller 640 represents a microcontroller or firmware logic that will read the system and DIMM configurations and track each memory error (either CE or UE) with microlevel error location information and attributes from error detector 650. The microlevel error information can include cells, bitlines (columns), wordlines (rows), banks, chips, and ranks. Region detector 642 or other logic within controller 640 can infer whether an underlying microlevel component is defective based on the CE/UE history.

In one example, directory 644 is implemented in a nonvolatile memory, as represented by NVRAM 660. NVRAM 660 enables persistence of defective region directory information between system boots. NVRAM 660 provides an example of information that can be stored in directory 644. Directory 644 can represent a list of defective memory regions, populated with corresponding row/column address (row address, column address, or a sub range of a row/column address).

DMRD0 can represent a first record for a first defective region of directory 644. The region is identified as rank0/chip1/bank1/row X. The second defective region, shown by record DMRD1, is identified as rank0/chip1/bank1/column Y. Both the first and second defective regions are identified by specific component addresses, namely, a row address (row X) and a column address (column Y).

DMRD2 is a third record, identifying the third defective region as rank1/chip0/bank2/<row X, min_column Y, max_column Z>. The X and Y variables are not necessarily the same as for DMRD0 and DMRD1. The defective region in DMRD2 is identified as a range of column addresses for row X. DMRD3 is a fourth record, identifying the fourth defective region as rank1/chip1/bank1/<min_row X, max_row Y, column Z>. Again, the variables are not necessarily the same as for the other records. The defective region in DMRD3 is identified as a range of row addresses for column Z.

In one example, during system boot, system 600 allocates a configurable amount of physical memory (e.g., 1 GB) as the sparing memory out of the total available memory capacity. The amount can be configurable by the system BIOS. The sparing memory range is OS invisible, which makes it inaccessible to the host OS, while the rest of the memory can be allocated as OS accessible, enabling the OS to use the memory to store system data and user data.

Figure 7A:
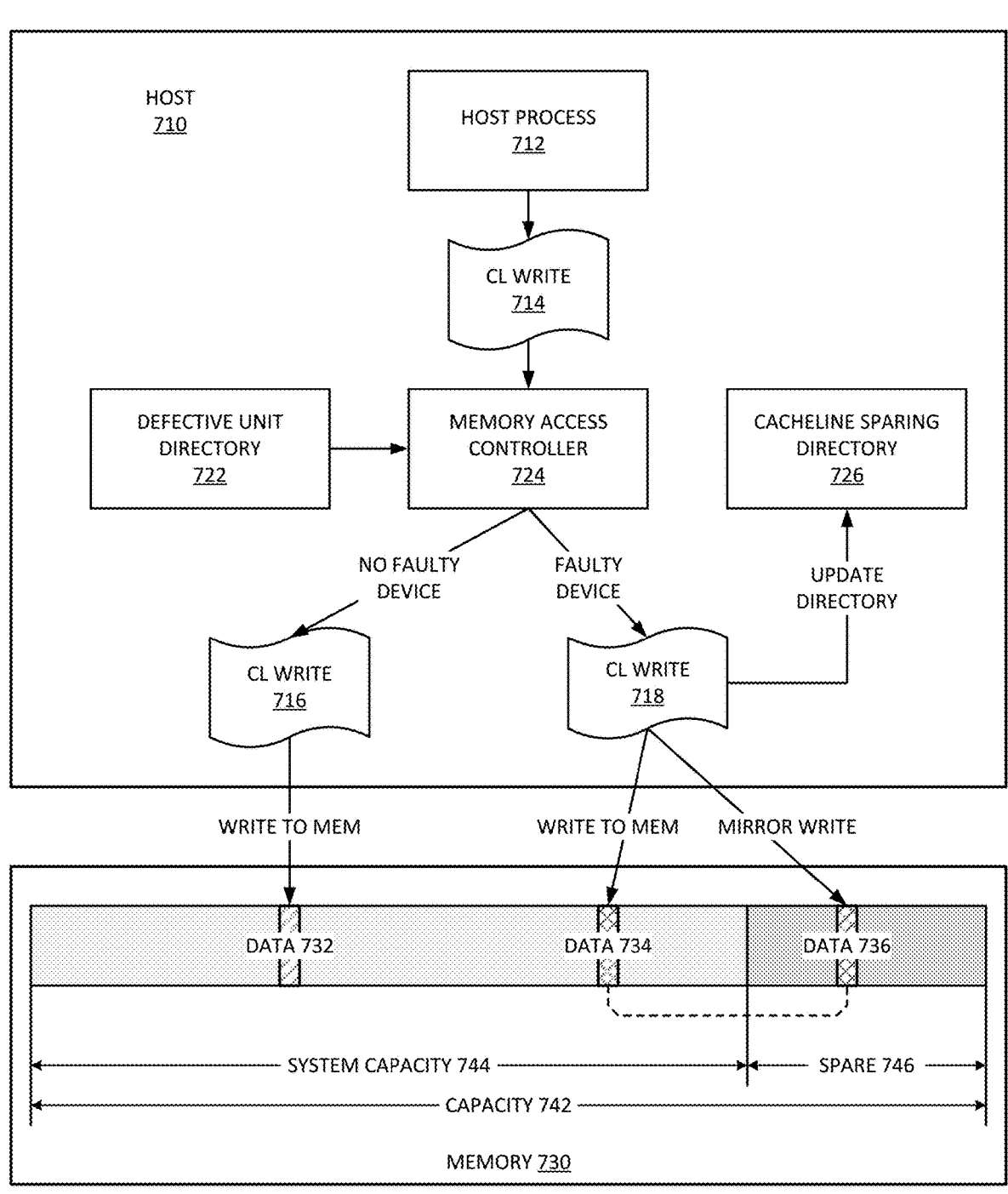
FIG. 7A is a block diagram of an example of write logic in a system with defective memory control.

FIG. 7A is a block diagram of an example of write logic in a system with defective memory control. System 702 represents a system in accordance with an example of system 100 or an example of system 204, or an example of system 600. System 702 represents the logical architecture that can be executed by hardware systems represented.

System 702 includes host 710, which represents a host platform that includes a host processor (not specifically shown) to execute host process 712. Host process 712 generates a write request for a cacheline, represented by cacheline (CL) write 714.

Memory access controller 724 manages access to memory 730. Memory access controller 724 can be executed by a memory controller, or executed by a platform controller that manages sparing data accessible to the memory controller. Memory 730 includes system capacity 744, which represents an OS accessible physical memory space. System capacity 744 is visible to the operating system under which host process 712 executes. Memory 730 also includes spare capacity, represented by spare 746, which is invisible to the OS. The full capacity of memory 730 is represented by capacity 742.

Memory access controller 724 receives CL write 714 from host process 712. In one example, memory access controller 724 checks defective unit directory 722 to determine if all or a part of the cacheline is directed to a defective memory region. In one example, when the host requests CL write 714 to memory 730, memory access controller 724 can check defective unit directory 722 to determine whether any of the cacheline is written to an identified defective memory region (DMR). If none of the cacheline is written to an identified DMR, then there is no faulty device, and the system can perform a normal write, represented by CL write 716. CL write 716 is a write to memory (MEM), represented by data 732 in system capacity 744.

If some of the cacheline falls to an identified DMR, then one or more data units are being written to a faulty device, and the system can write the cacheline to OS accessible memory and at the same time write a copy of the cacheline to the spare memory as a replica. CL write 718 represents the write to system capacity 744, represented by data 734, and the mirror write to spare 746, represented by data 736. In one example, memory access controller 724 will then update cacheline sparing mapping information, for example, in cacheline sparing directory (CLSD) 726.

It will be understood that such a replicating action, in response to a request to access a defective cacheline, can be referred as 'lazy' mirroring, since the mirroring action only happens in response to a write operation or write request. In one example, memory access controller 724 can alternatively implement a mirroring policy to make an 'eager' or 'proactive' replication during either a read or a write operation. With a proactive mirroring policy, memory access controller 724 can write a replica of the corrected data of the cacheline to the sparing memory whenever a defective region is identified, instead of in response to an access request. Thus, the mirroring can occur prior to a request to access the defective region.

Figure 7B:
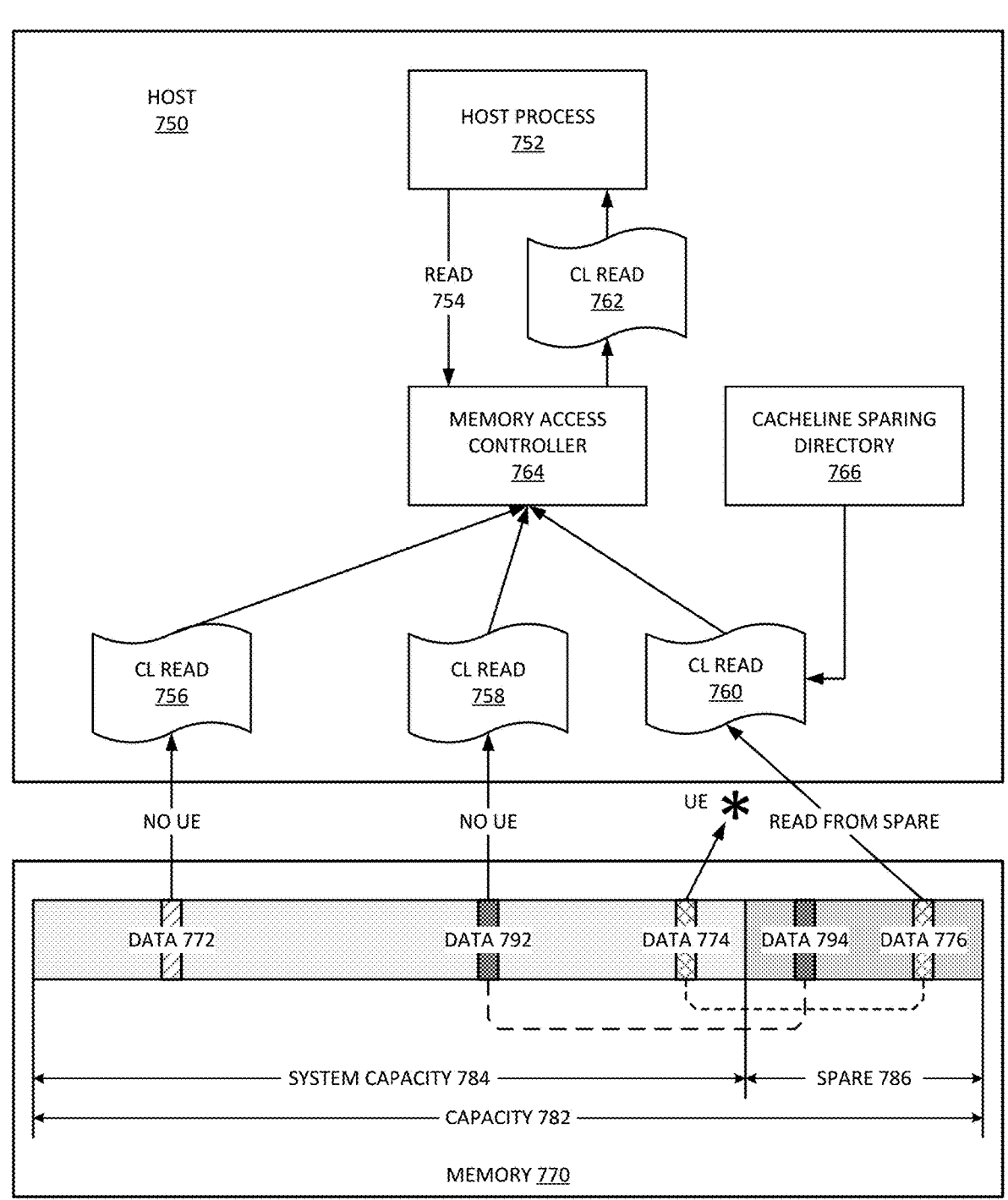
FIG. 7B is a block diagram of an example of read logic in a system with defective memory control.

FIG. 7B is a block diagram of an example of read logic in a system with defective memory control. System 704 represents a system in accordance with an example of system 100 or an example of system 204, or an example of system 600. System 704 represents the logical architecture that can be executed by hardware systems represented. System 702 and system 704 can be the same system.

System 704 includes host 750, which represents a host platform that includes a host processor (not specifically shown) to execute host process 752. Host process 752 generates a read request for a cacheline, represented by read 754.

Memory access controller 764 manages access to memory 770. Memory access controller 764 can be executed by a memory controller, or executed by a platform controller that manages sparing data accessible to the memory controller. Memory 770 includes system capacity 784, which represents an OS accessible physical memory space. System capacity 784 is visible to the operating system under which host process 752 executes. Memory 770 also includes spare capacity, represented by spare 786, which is invisible to the OS. The full capacity of memory 770 is represented by capacity 782.

Memory access controller 764 receives read 754 from host process 752. There are different read scenarios that can occur in system 704. Consider data 772, which has no UE when read, resulting in a normal read from system capacity 784, represented by CL read 756. Consider data 792 in system capacity 784, which is replicated with data 794 in spare 786. If there is no UE when data 792 is read, the result can be a normal read from system capacity 784, represented by CL read 758. The fact that data is mirrored does not mean every read to data that has a replica will result in a UE.

Consider data 774 in system capacity 784, which is replicated with data 776 in spare 786. Read of data 774 results in a UE. If data 774 did not have replica data, the result of the read would be an error. In response to the UE, in one example, memory access controller 764 can check for a replica of the cacheline in the sparing memory according to cacheline sparing directory 766. If the replica of the cacheline is available, represented by data 776 in spare 786, the read occurs from the sparing memory, as represented by CL read 760.

CL read 762 from memory access controller 764 to host process 752 represents the return of the data to the OS. CL read 762 can represent any of CL read 756, CL read 758, or CL read 760, depending on which read scenario occurs. If the data cannot be read in any of the scenarios described, in one example, memory access controller 764 returns an uncorrectable error to the OS.

Figure 8:
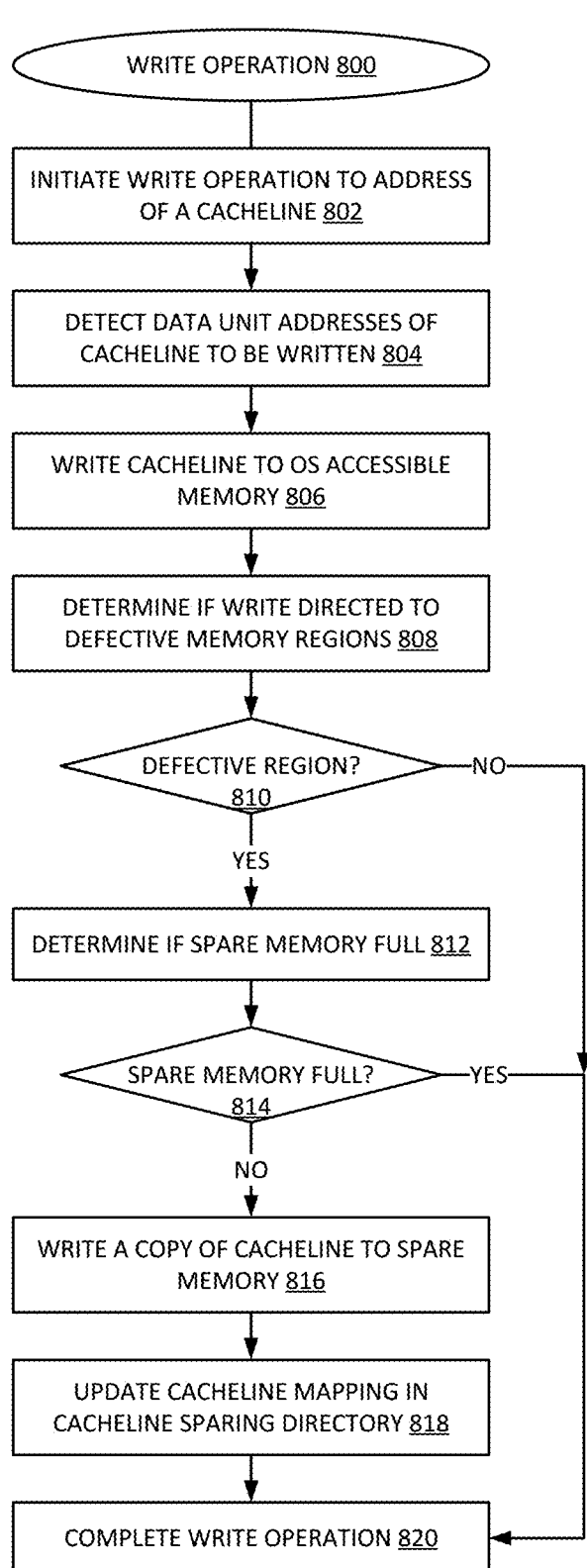
FIG. 8 is a flow diagram of an example of a process for a write operation with fault-aware sparing.

FIG. 8 is a flow diagram of an example of a process for a write operation with fault-aware sparing. Process 800 represents write operation by a system that is capable to detect microlevel faults and perform runtime sparing specific to the faults detected.

The host can initiate a write operation to an address of a cacheline, at 802. In one example, the memory controller detects data unit addresses of the cacheline to be written, at 804. The memory controller prepares to write the cacheline to OS accessible memory, at 806.

In one example, the memory controller can access a faulty region directory to determine if the write is directed to defective memory regions, at 808. If the write is not directed to a defective region, at 810 NO branch, the memory controller can complete the write operation, at 820. In such a case, completion of the write operation will be a standard write to OS accessible memory space.

If the write is directed to a defective region, at 810 YES branch, in one example, the memory controller can determine if the spare memory is full, at 812. If the spare memory is full, at 814 YES branch, in one example, the memory controller completes the write operation, at 820. In such a case, completion of the write operation can be a failure because the region selected for write is defective and there is no spare capacity.

If the spare memory region is not full, at 814 NO branch, in one example, the memory controller can write a copy of the cacheline to the spare memory, at 816. The controller can update the cacheline mapping in a cacheline sparing directory, at 818, or other directory used to track defective memory regions. The memory controller can complete the write operation, at 820.

Figure 9:
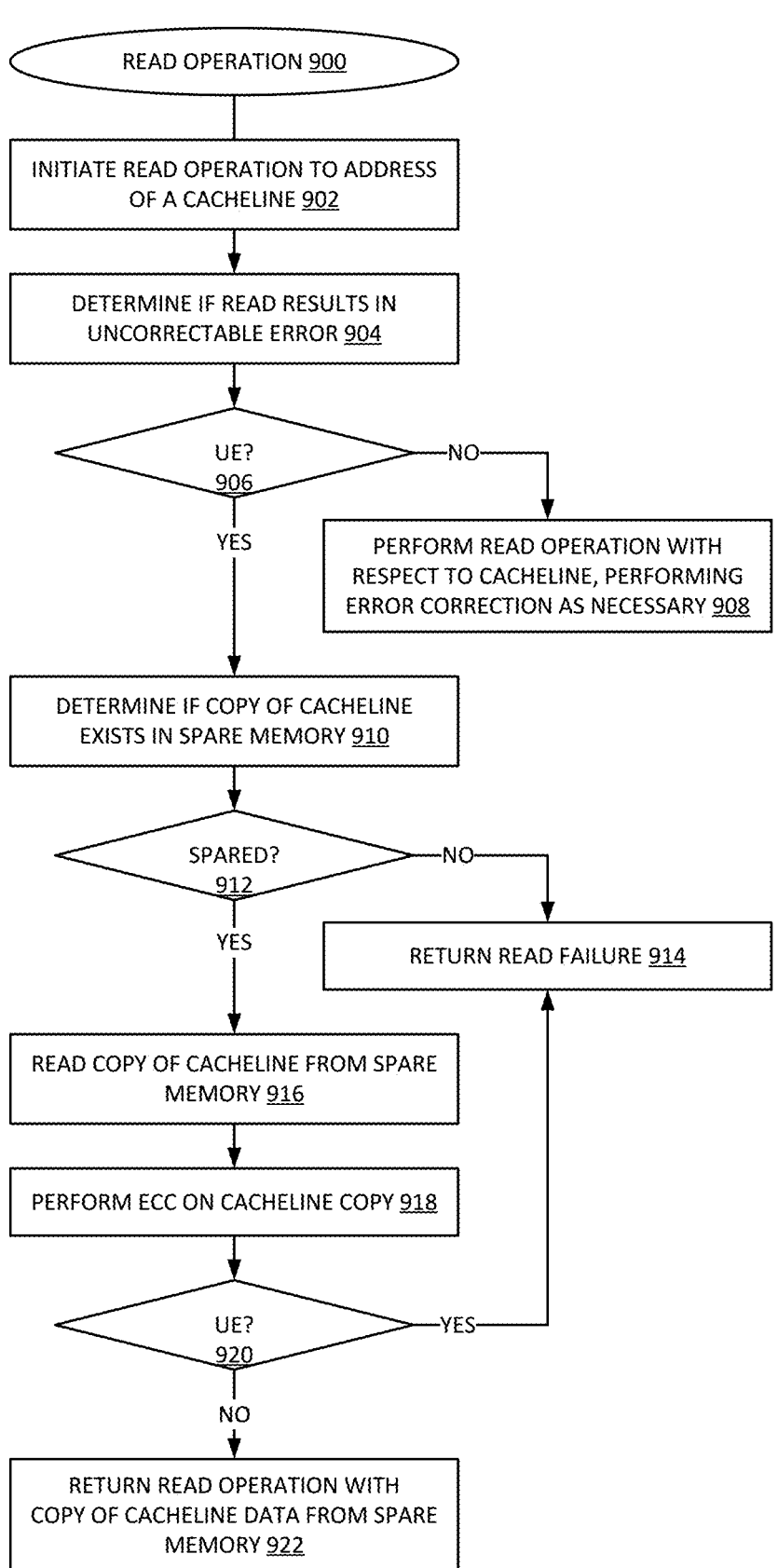
FIG. 9 is a flow diagram of an example of a process for a read operation with fault-aware sparing.

FIG. 9 is a flow diagram of an example of a process for a read operation with fault-aware sparing. Process 900 represents write operation by a system that is capable to detect microlevel faults and perform runtime sparing specific to the faults detected.

The host can initiate a read operation to an address of a cacheline, at 902. In one example, the memory controller determines if the read results in an uncorrectable error (UE), at 904. If the read does not result in a UE, at 906 NO branch, in one example, the memory controller performs the read operation with respect to the cacheline, performing error correction as necessary, at 908. The system performs error correction if the data has a correctable error.

If the read results in a UE, at 906 YES branch, in one example, the memory controller determines if a copy of the cacheline exists in spare memory, at 910. If the data is not spare, at 912 NO branch, the memory controller can return a read failure, at 914.

If the data has been mirrored to a spare memory, at 912 YES branch, in one example, the memory controller reads the copy of the cacheline from the spare memory, at 916. The system can perform ECC on the cacheline copy, at 918. If the ECC check results in a UE, at 920 YES branch, the memory controller can return a read failure, at 914. If the ECC check results in no error or corrects a correctable error, at 920 NO branch, the memory controller can return the read operation with a copy of the cacheline data from the spare memory, at 922.

Figure 10:
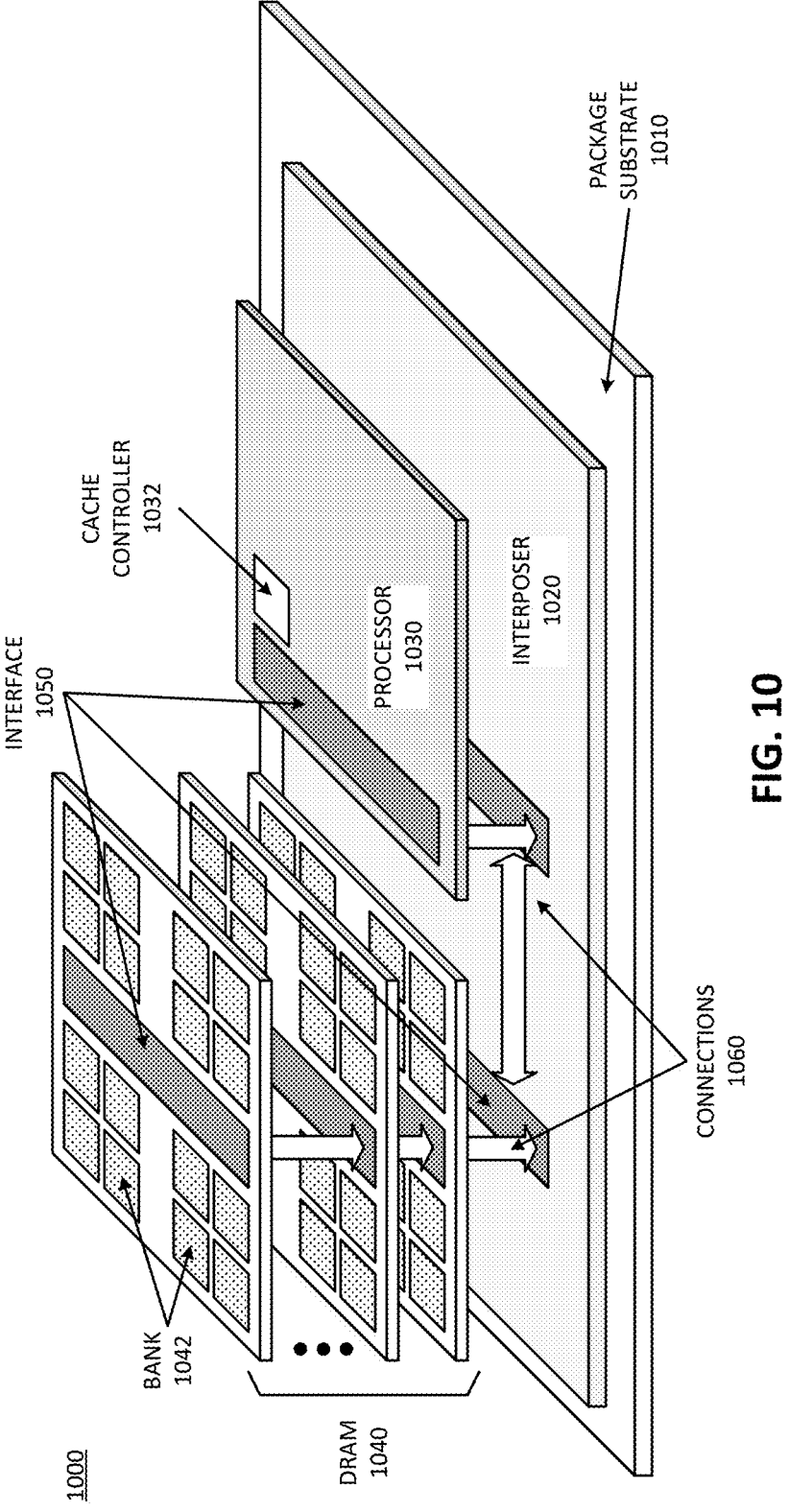
FIG. 10 is a block diagram of an example of a system for uncorrectable error mitigation with a stacked memory architecture.

FIG. 10 is a block diagram of an example of a system for uncorrectable error mitigation with a stacked memory architecture. System 1000 is an example of a memory system in accordance with system 100, system 204, or system 600. System 1000 includes a memory stack architecture monitored by a memory fault tracker that can perform mirroring.

Package substrate 1010 illustrates an SOC package substrate. Package substrate 1010 typically includes traces to route to interconnection points of the SOC package. Interposer 1020 is integrated onto package substrate 1010 and interconnects the processor chip with the memory stack. Interfaces 1050 (the dark shaded strips) illustrate hardware interconnection points. The arrows between the various interfaces 1050 represent connections 1060 from one chip to another through interfaces 1050.

Processor 1030 represents a processor or central processing unit (CPU) chip or graphics processing unit (GPU) chip to be disposed on interposer 1020. Processor 1030 performs the computational operations in system 1000. In one example, processor 1030 includes multiple cores (not specifically shown), which can generate operations that request data to be read from and written to memory. Cache controller 1032 represents a circuit on processor 1030 to manage interface 1050 from processor 1030 to memory (DRAMs 1040). Cache controller 1032 can alternatively be referred to as a memory controller.

DRAMs 1040 represent a stack of memory devices, such as an HBM architecture. Each DRAM 1040 is illustrated as having 16 banks 1042, although other memory configurations can be used. Banks 1042 can include memory arrays in accordance with what is illustrated in system 400. Each DRAM 1040 can include an interface 1050 to connect to interposer 1020, and through interposer 1020 to processor 1030.

In one example, cache controller 1032 includes a memory fault tracker controller circuit to perform fault-aware analysis in accordance with any example herein. In one example, the memory fault tracker controller is integrated on interposer 1020. In one example, the memory fault tracker controller performs runtime mirroring in accordance with any example herein in response to detection of an uncorrectable error. The ability to perform runtime mirroring that is precise to a fault component in memory can improve the reliability, availability, and serviceability of a system. Such an ability is especially beneficial for an HBM-embedded SOC, in accordance with an example of system 1000, where a memory fault has the potential to disable the function of the entire SOC.

Figure 11:
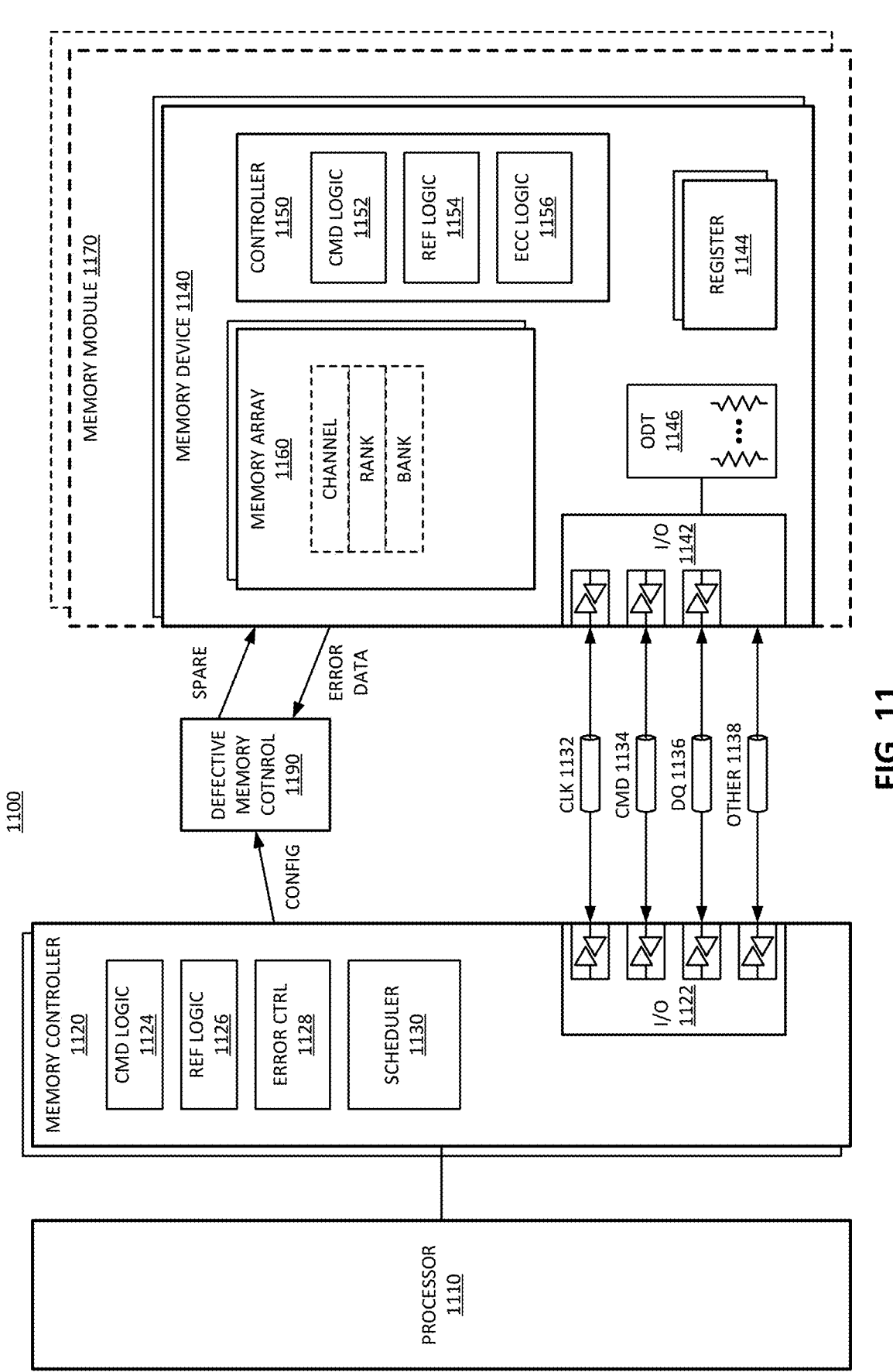
FIG. 11 is a block diagram of an example of a memory subsystem in which fault-aware sparing can be implemented.

FIG. 11 is a block diagram of an example of a memory subsystem in which fault-aware sparing can be implemented. System 1100 includes a processor and elements of a memory subsystem in a computing device. System 1100 is an example of a system in accordance with an example of system 100, system 204, or system 600.

In one example, system 1100 includes defective memory control 1190 or other memory fault tracking engine to determine a component that is a cause of a detected UE. In one example, defective memory control 1190 is part of error control (CTRL) 1128 of memory controller 1120. Error control 1128 can provide memory error management for system 1100. Defective memory control 1190 can correlate detected errors (ERROR DATA) with hardware configuration information (CONFIG) to determine with high confidence a component that is the cause of the UE. In response to detection of the UE (for example, by ECC logic 1156), defective memory control 1190 can perform a runtime spare operation, in accordance with any example herein.

Processor 1110 represents a processing unit of a computing platform that may execute an operating system (OS) and applications, which can collectively be referred to as the host or the user of the memory. The OS and applications execute operations that result in memory accesses. Processor 1110 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 1100 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random-access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, originally published by JEDEC in July 2020), LPDDR5 (LPDDR version 5, JESD209-5, originally published by JEDEC in February 2019), HBM2 (HBM version 2, JESD235C, originally published by JEDEC in January 2020), HBM3 (HBM version 3, JESD238, originally published by JEDEC in January 2022), or others or combinations of memory technologies, and technologies based on derivatives or extensions of such specifications.

Memory controller 1120 represents one or more memory controller circuits or devices for system 1100. Memory controller 1120 represents control logic that generates memory access commands in response to the execution of operations by processor 1110. Memory controller 1120 accesses one or more memory devices 1140. Memory devices 1140 can be DRAM devices in accordance with any referred to above. In one example, memory devices 1140 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 1120 manages a separate memory channel, although system 1100 can be configured to have multiple channels managed by a single controller, or to have multiple controllers on a single channel. In one example, memory controller 1120 is part of host processor 1110, such as logic implemented on the same die or implemented in the same package space as the processor.

Memory controller 1120 includes I/O interface logic 1122 to couple to a memory bus, such as a memory channel as referred to above. I/O interface logic 1122 (as well as I/O interface logic 1142 of memory device 1140) can include pins, pads, connectors, signal lines, traces, or wires, or other hardware to connect the devices, or a combination of these. I/O interface logic 1122 can include a hardware interface. As illustrated, I/O interface logic 1122 includes at least drivers/transceivers for signal lines. Commonly, wires within an integrated circuit interface couple with a pad, pin, or connector to interface signal lines or traces or other wires between devices. I/O interface logic 1122 can include drivers, receivers, transceivers, or termination, or other circuitry or combinations of circuitry to exchange signals on the signal lines between the devices. The exchange of signals includes at least one of transmit or receive. While shown as coupling I/O 1122 from memory controller 1120 to I/O 1142 of memory device 1140, it will be understood that in an implementation of system 1100 where groups of memory devices 1140 are accessed in parallel, multiple memory devices can include I/O interfaces to the same interface of memory controller 1120. In an implementation of system 1100 including one or more memory modules 1170, I/O 1142 can include interface hardware of the memory module in addition to interface hardware on the memory device itself. Other memory controllers 1120 will include separate interfaces to other memory devices 1140.

The bus between memory controller 1120 and memory devices 1140 can be implemented as multiple signal lines coupling memory controller 1120 to memory devices 1140. The bus may typically include at least clock (CLK) 1132, command/address (CMD) 1134, and write data (DQ) and read data (DQ) 1136, and zero or more other signal lines 1138. In one example, a bus or connection between memory controller 1120 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 1100 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 1120 and memory devices 1140. An example of a serial bus technology is 8B10B encoding and transmission of high-speed data with embedded clock over a single differential pair of signals in each direction. In one example, CMD 1134 represents signal lines shared in parallel with multiple memory devices. In one example, multiple memory devices share encoding command signal lines of CMD 1134, and each has a separate chip select (CS_n) signal line to select individual memory devices.

It will be understood that in the example of system 1100, the bus between memory controller 1120 and memory devices 1140 includes a subsidiary command bus CMD 1134 and a subsidiary bus to carry the write and read data, DQ 1136. In one example, the data bus can include bidirectional lines for read data and for write/command data. In another example, the subsidiary bus DQ 1136 can include unidirectional write signal lines for write and data from the host to memory, and can include unidirectional lines for read data from the memory to the host. In accordance with the chosen memory technology and system design, other signals 1138 may accompany a bus or sub bus, such as strobe lines DQS. Based on design of system 1100, or implementation if a design supports multiple implementations, the data bus can have more or less bandwidth per memory device 1140. For example, the data bus can support memory devices that have either a ×4 interface, a ×8 interface, a ×16 interface, or other interface. The convention "xW," where W is an integer that refers to an interface size or width of the interface of memory device 1140, which represents a number of signal lines to exchange data with memory controller 1120. The interface size of the memory devices is a controlling factor on how many memory devices can be used concurrently per channel in system 1100 or coupled in parallel to the same signal lines. In one example, high bandwidth memory devices, wide interface devices, or stacked memory configurations, or combinations, can enable wider interfaces, such as a ×128 interface, a ×256 interface, a ×512 interface, a ×1024 interface, or other data bus interface width.

In one example, memory devices 1140 and memory controller 1120 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 1140 can transfer data on each UI. Thus, a ×8 memory device operating on BL8 can transfer 64 bits of data (8 data signal lines times 8 data bits transferred per line over the burst). It will be understood that this simple example is merely an illustration and is not limiting.

Memory devices 1140 represent memory resources for system 1100. In one example, each memory device 1140 is a separate memory die. In one example, each memory device 1140 can interface with multiple (e.g., 2) channels per device or die. Each memory device 1140 includes I/O interface logic 1142, which has a bandwidth determined by the implementation of the device (e.g., ×16 or ×8 or some other interface bandwidth). I/O interface logic 1142 enables the memory devices to interface with memory controller 1120. I/O interface logic 1142 can include a hardware interface, and can be in accordance with I/O 1122 of memory controller, but at the memory device end. In one example, multiple memory devices 1140 are connected in parallel to the same command and data buses. In another example, multiple memory devices 1140 are connected in parallel to the same command bus, and are connected to different data buses. For example, system 1100 can be configured with multiple memory devices 1140 coupled in parallel, with each memory device responding to a command, and accessing memory resources 1160 internal to each. For a Write operation, an individual memory device 1140 can write a portion of the overall data word, and for a Read operation, an individual memory device 1140 can fetch a portion of the overall data word. The remaining bits of the word will be provided or received by other memory devices in parallel.

In one example, memory devices 1140 are disposed directly on a motherboard or host system platform (e.g., a PCB (printed circuit board) or substrate on which processor 1110 is disposed) of a computing device. In one example, memory devices 1140 can be organized into memory modules 1170. In one example, memory modules 1170 represent dual inline memory modules (DIMMs). In one example, memory modules 1170 represent other organization of multiple memory devices to share at least a portion of access or control circuitry, which can be a separate circuit, a separate device, or a separate board from the host system platform. Memory modules 1170 can include multiple memory devices 1140, and the memory modules can include support for multiple separate channels to the included memory devices disposed on them. In another example, memory devices 1140 may be incorporated into the same package as memory controller 1120, such as by techniques such as multi-chip-module (MCM), package-on-package, through-silicon via (TSV), or other techniques or combinations. Similarly, in one example, multiple memory devices 1140 may be incorporated into memory modules 1170, which themselves may be incorporated into the same package as memory controller 1120. It will be appreciated that for these and other implementations, memory controller 1120 may be part of host processor 1110.

Memory devices 1140 each include one or more memory arrays 1160. Memory array 1160 represents addressable memory locations or storage locations for data. Typically, memory array 1160 is managed as rows of data, accessed via wordline (rows) and bitline (individual bits within a row) control. Memory array 1160 can be organized as separate channels, ranks, and banks of memory. Channels may refer to independent control paths to storage locations within memory devices 1140. Ranks may refer to common locations across multiple memory devices (e.g., same row addresses within different devices) in parallel. Banks may refer to sub-arrays of memory locations within a memory device 1140. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 1140 include one or more registers 1144. Register 1144 represents one or more storage devices or storage locations that provide configuration or settings for the operation of the memory device. In one example, register 1144 can provide a storage location for memory device 1140 to store data for access by memory controller 1120 as part of a control or management operation. In one example, register 1144 includes one or more Mode Registers. In one example, register 1144 includes one or more multipurpose registers. The configuration of locations within register 1144 can configure memory device 1140 to operate in different "modes," where command information can trigger different operations within memory device 1140 based on the mode. Additionally or in the alternative, different modes can also trigger different operation from address information or other signal lines depending on the mode. Settings of register 1144 can indicate configuration for I/O settings (e.g., timing, termination or ODT (on-die termination) 1146, driver configuration, or other I/O settings).

In one example, memory device 1140 includes ODT 1146 as part of the interface hardware associated with I/O 1142. ODT 1146 can be configured as mentioned above, and provide settings for impedance to be applied to the interface to specified signal lines. In one example, ODT 1146 is applied to DQ signal lines. In one example, ODT 1146 is applied to command signal lines. In one example, ODT 1146 is applied to address signal lines. In one example, ODT 1146 can be applied to any combination of the preceding. The ODT settings can be changed based on whether a memory device is a selected target of an access operation or a non-target device. ODT 1146 settings can affect the timing and reflections of signaling on the terminated lines. Careful control over ODT 1146 can enable higher-speed operation with improved matching of applied impedance and loading. ODT 1146 can be applied to specific signal lines of I/O interface 1142, 1122 (for example, ODT for DQ lines or ODT for CA lines), and is not necessarily applied to all signal lines.

Memory device 1140 includes controller 1150, which represents control logic within the memory device to control internal operations within the memory device. For example, controller 1150 decodes commands sent by memory controller 1120 and generates internal operations to execute or satisfy the commands. Controller 1150 can be referred to as an internal controller, and is separate from memory controller 1120 of the host. Controller 1150 can determine what mode is selected based on register 1144, and configure the internal execution of operations for access to memory resources 1160 or other operations based on the selected mode. Controller 1150 generates control signals to control the routing of bits within memory device 1140 to provide a proper interface for the selected mode and direct a command to the proper memory locations or addresses. Controller 1150 includes command logic 1152, which can decode command encoding received on command and address signal lines. Thus, command logic 1152 can be or include a command decoder. With command logic 1152, memory device can identify commands and generate internal operations to execute requested commands.

Referring again to memory controller 1120, memory controller 1120 includes command (CMD) logic 1124, which represents logic or circuitry to generate commands to send to memory devices 1140. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 1140, memory controller 1120 can issue commands via I/O 1122 to cause memory device 1140 to execute the commands. In one example, controller 1150 of memory device 1140 receives and decodes command and address information received via I/O 1142 from memory controller 1120. Based on the received command and address information, controller 1150 can control the timing of operations of the logic and circuitry within memory device 1140 to execute the commands. Controller 1150 is responsible for compliance with standards or specifications within memory device 1140, such as timing and signaling requirements. Memory controller 1120 can implement compliance with standards or specifications by access scheduling and control.

Memory controller 1120 includes scheduler 1130, which represents logic or circuitry to generate and order transactions to send to memory device 1140. From one perspective, the primary function of memory controller 1120 could be said to schedule memory access and other transactions to memory device 1140. Such scheduling can include generating the transactions themselves to implement the requests for data by processor 1110 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 1120 typically includes logic such as scheduler 1130 to allow selection and ordering of transactions to improve performance of system 1100. Thus, memory controller 1120 can select which of the outstanding transactions should be sent to memory device 1140 in which order, which is typically achieved with logic much more complex that a simple first-in first-out algorithm. Memory controller 1120 manages the transmission of the transactions to memory device 1140, and manages the timing associated with the transaction. In one example, transactions have deterministic timing, which can be managed by memory controller 1120 and used in determining how to schedule the transactions with scheduler 1130.

In one example, memory controller 1120 includes refresh (REF) logic 1126. Refresh logic 1126 can be used for memory resources that are volatile and need to be refreshed to retain a deterministic state. In one example, refresh logic 1126 indicates a location for refresh, and a type of refresh to perform. Refresh logic 1126 can trigger self-refresh within memory device 1140, or execute external refreshes which can be referred to as auto refresh commands) by sending refresh commands, or a combination. In one example, controller 1150 within memory device 1140 includes refresh logic 1154 to apply refresh within memory device 1140. In one example, refresh logic 1154 generates internal operations to perform refresh in accordance with an external refresh received from memory controller 1120. Refresh logic 1154 can determine if a refresh is directed to memory device 1140, and what memory resources 1160 to refresh in response to the command.

Figure 12:
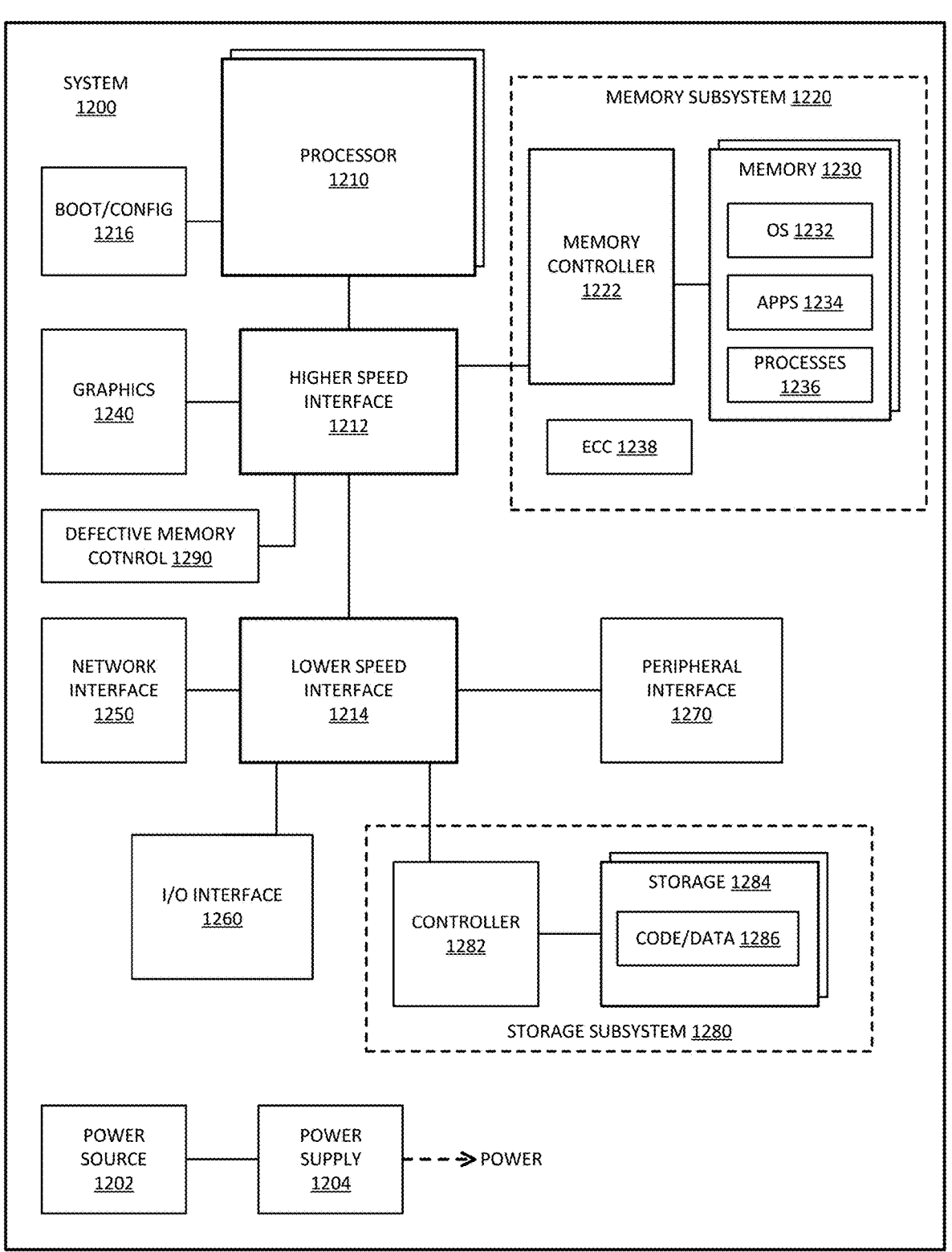
FIG. 12 is a block diagram of an example of a computing system in which fault-aware sparing can be implemented.

FIG. 12 is a block diagram of an example of a computing system in which fault-aware sparing can be implemented. System 1200 represents a computing device in accordance with any example herein, and can be a laptop computer, a desktop computer, a tablet computer, a server, a gaming or entertainment control system, embedded computing device, or other electronic device.

In one example, system 1200 includes defective memory control 1290 or other memory fault tracking engine to determine a component that is a cause of a detected UE. In one example, defective memory control 1290 is part of memory controller 1222. In one example, memory subsystem 1220 includes ECC 1238, to perform error checking and correction on data of memory 1230. In one example, ECC 1238 can detect errors as part of a scrubbing operation, which can detect correctable errors or an uncorrectable error. In response to detection of the UE, defective memory control 1290 can perform a runtime spare operation, in accordance with any example herein.

System 1200 includes processor 1210 can include any type of microprocessor, central processing unit (CPU), graphics processing unit (GPU), processing core, or other processing hardware, or a combination, to provide processing or execution of instructions for system 1200. Processor 1210 can be a host processor device. Processor 1210 controls the overall operation of system 1200, and can be or include, one or more programmable general-purpose or special-purpose microprocessors, digital signal processors (DSPs), programmable controllers, application specific integrated circuits (ASICs), programmable logic devices (PLDs), or a combination of such devices.

System 1200 includes boot/config 1216, which represents storage to store boot code (e.g., basic input/output system (BIOS)), configuration settings, security hardware (e.g., trusted platform module (TPM)), or other system level hardware that operates outside of a host OS. Boot/config 1216 can include a nonvolatile storage device, such as read-only memory (ROM), flash memory, or other memory devices.

In one example, system 1200 includes interface 1212 coupled to processor 1210, which can represent a higher speed interface or a high throughput interface for system components that need higher bandwidth connections, such as memory subsystem 1220 or graphics interface components 1240. Interface 1212 represents an interface circuit, which can be a standalone component or integrated onto a processor die. Interface 1212 can be integrated as a circuit onto the processor die or integrated as a component on a system on a chip. Where present, graphics interface 1240 interfaces to graphics components for providing a visual display to a user of system 1200. Graphics interface 1240 can be a standalone component or integrated onto the processor die or system on a chip. In one example, graphics interface 1240 can drive a high definition (HD) display or ultra high definition (UHD) display that provides an output to a user. In one example, the display can include a touch-screen display. In one example, graphics interface 1240 generates a display based on data stored in memory 1230 or based on operations executed by processor 1210 or both.

Memory subsystem 1220 represents the main memory of system 1200, and provides storage for code to be executed by processor 1210, or data values to be used in executing a routine. Memory subsystem 1220 can include one or more varieties of random-access memory (RAM) such as DRAM, 3DXP (three-dimensional crosspoint), or other memory devices, or a combination of such devices. Memory 1230 stores and hosts, among other things, operating system (OS) 1232 to provide a software platform for execution of instructions in system 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for system 1200. In one example, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210, such as integrated onto the processor die or a system on a chip.

While not specifically illustrated, it will be understood that system 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 1200 includes interface 1214, which can be coupled to interface 1212. Interface 1214 can be a lower speed interface than interface 1212. In one example, interface 1214 represents an interface circuit, which can include standalone components and integrated circuitry. In one example, multiple user interface components or peripheral components, or both, couple to interface 1214. Network interface 1250 provides system 1200 the ability to communicate with remote devices (e.g., servers or other computing devices) over one or more networks. Network interface 1250 can include an Ethernet adapter, wireless interconnection components, cellular network interconnection components, USB (universal serial bus), or other wired or wireless standards-based or proprietary interfaces.

Network interface 1250 can exchange data with a remote device, which can include sending data stored in memory or receiving data to be stored in memory.

In one example, system 1200 includes one or more input/output (I/O) interface(s) 1260. I/O interface 1260 can include one or more interface components through which a user interacts with system 1200 (e.g., audio, alphanumeric, tactile/touch, or other interfacing). Peripheral interface 1270 can include any hardware interface not specifically mentioned above. Peripherals refer generally to devices that connect dependently to system 1200. A dependent connection is one where system 1200 provides the software platform or hardware platform or both on which operation executes, and with which a user interacts.

In one example, system 1200 includes storage subsystem 1280 to store data in a nonvolatile manner. In one example, in certain system implementations, at least certain components of storage 1280 can overlap with components of memory subsystem 1220. Storage subsystem 1280 includes storage device(s) 1284, which can be or include any conventional medium for storing large amounts of data in a nonvolatile manner, such as one or more magnetic, solid state, NAND, 3DXP, or optical based disks, or a combination. Storage 1284 holds code or instructions and data 1286 in a persistent state (i.e., the value is retained despite interruption of power to system 1200). Storage 1284 can be generically considered to be a "memory," although memory 1230 is typically the executing or operating memory to provide instructions to processor 1210. Whereas storage 1284 is nonvolatile, memory 1230 can include volatile memory (i.e., the value or state of the data is indeterminate if power is interrupted to system 1200). In one example, storage subsystem 1280 includes controller 1282 to interface with storage 1284. In one example controller 1282 is a physical part of interface 1214 or processor 1210, or can include circuits or logic in both processor 1210 and interface 1214.

Power source 1202 provides power to the components of system 1200. More specifically, power source 1202 typically interfaces to one or multiple power supplies 1204 in system 1200 to provide power to the components of system 1200. In one example, power supply 1204 includes an AC to DC (alternating current to direct current) adapter to plug into a wall outlet. Such AC power can be renewable energy (e.g., solar power) power source 1202. In one example, power source 1202 includes a DC power source, such as an external AC to DC converter. In one example, power source 1202 or power supply 1204 includes wireless charging hardware to charge via proximity to a charging field. In one example, power source 1202 can include an internal battery or fuel cell source.

Figure 13:
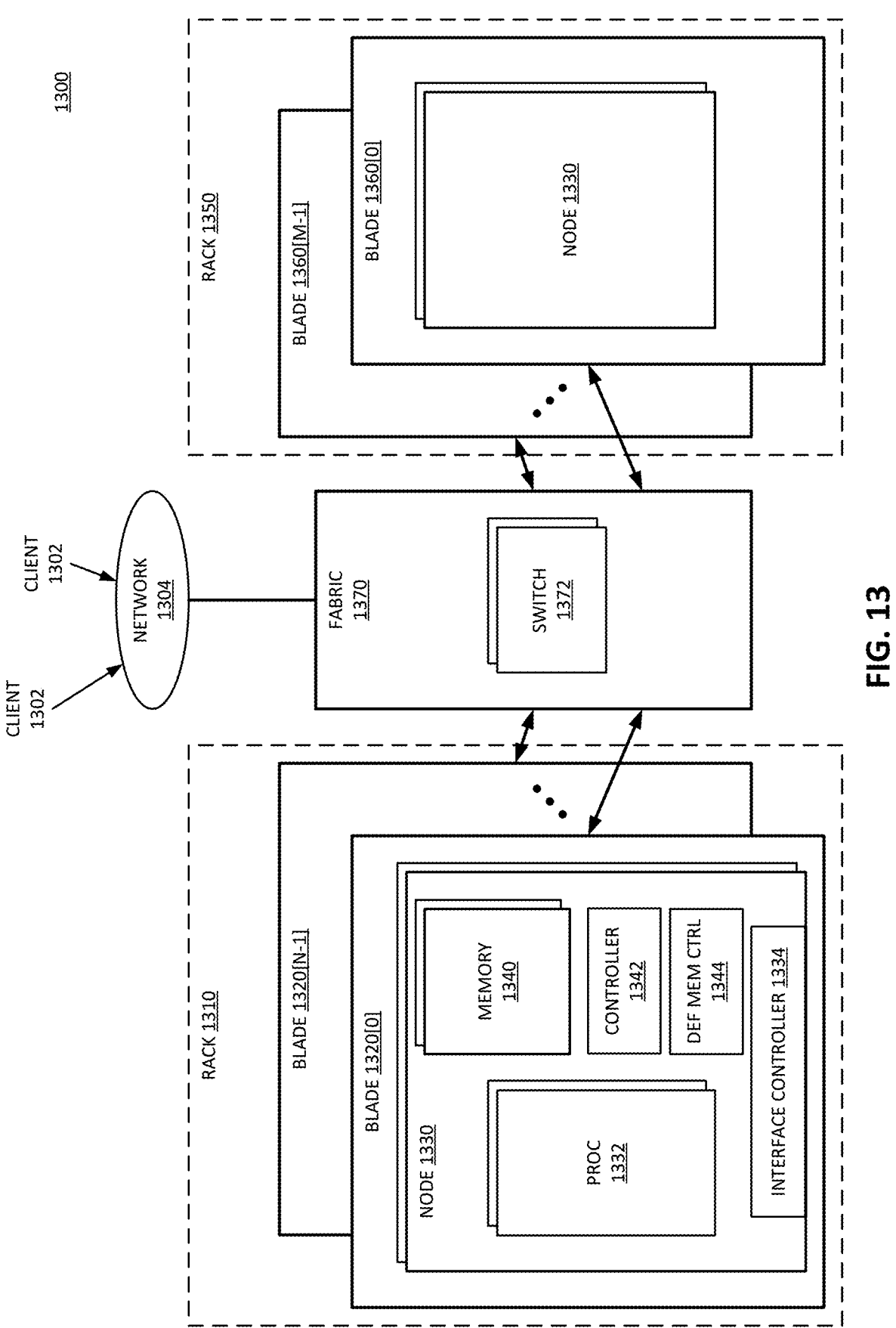
FIG. 13 is a block diagram of an example of a multi-node network in which fault-aware sparing can be implemented.

FIG. 13 is a block diagram of an example of a multi-node network in which fault-aware sparing can be implemented. In one example, system 1300 represents a server farm. In one example, system 1300 represents a data cloud or a processing cloud. Nodes 1330 of system 1300 represent a system in accordance with an example of system 100, an example of system 204, or an example of system 600. Node 1330 includes memory 1340. Node 1330 includes controller 1342, which represents a memory controller to manage access to memory 1340.

In one example, node 1330 includes defective (DEF) memory (MEM) control (CTRL) 1344 or other memory fault tracking engine to determine a component that is a cause of a detected UE. In one example, defective memory control 1344 is part of memory controller 1342. Defective memory control 1344 can correlate detected errors with hardware configuration information to determine with high confidence a component that is the cause of the UE. In response to detection of a UE, defective memory control 1344 can perform a runtime spare operation, in accordance with any example herein.

One or more clients 1302 make requests over network 1304 to system 1300. Network 1304 represents one or more local networks, or wide area networks, or a combination. Clients 1302 can be human or machine clients, which generate requests for the execution of operations by system 1300. System 1300 executes applications or data computation tasks requested by clients 1302.

In one example, system 1300 includes one or more racks, which represent structural and interconnect resources to house and interconnect multiple computation nodes. In one example, rack 1310 includes multiple nodes 1330. In one example, rack 1310 hosts multiple blade components 1320. Hosting refers to providing power, structural or mechanical support, and interconnection. Blades 1320 can refer to computing resources on printed circuit boards (PCBs), where a PCB houses the hardware components for one or more nodes 1330. In one example, blades 1320 do not include a chassis or housing or other "box" other than that provided by rack 1310. In one example, blades 1320 include housing with exposed connector to connect into rack 1310. In one example, system 1300 does not include rack 1310, and each blade 1320 includes a chassis or housing that can stack or otherwise reside in close proximity to other blades and allow interconnection of nodes 1330.

System 1300 includes fabric 1370, which represents one or more interconnectors for nodes 1330. In one example, fabric 1370 includes multiple switches 1372 or routers or other hardware to route signals among nodes 1330. Additionally, fabric 1370 can couple system 1300 to network 1304 for access by clients 1302. In addition to routing equipment, fabric 1370 can be considered to include the cables or ports or other hardware equipment to couple nodes 1330 together. In one example, fabric 1370 has one or more associated protocols to manage the routing of signals through system 1300. In one example, the protocol or protocols is at least partly dependent on the hardware equipment used in system 1300.

As illustrated, rack 1310 includes N blades 1320. In one example, in addition to rack 1310, system 1300 includes rack 1350. As illustrated, rack 1350 includes M blades 1360. M is not necessarily the same as N; thus, it will be understood that various different hardware equipment components could be used, and coupled together into system 1300 over fabric 1370. Blades 1360 can be the same or similar to blades 1320. Nodes 1330 can be any type of node and are not necessarily all the same type of node. System 1300 is not limited to being homogenous, nor is it limited to not being homogenous.

For simplicity, only the node in blade 1320[0] is illustrated in detail. However, other nodes in system 1300 can be the same or similar. At least some nodes 1330 are computation nodes, with processor (proc) 1332 and memory 1340. A computation node refers to a node with processing resources (e.g., one or more processors) that executes an operating system and can receive and process one or more tasks. In one example, at least some nodes 1330 are server nodes with a server as processing resources represented by processor 1332 and memory 1340. A storage server refers to a node with more storage resources than a computation node, and rather than having processors for the execution of tasks, a storage server includes processing resources to manage access to the storage nodes within the storage server.

In one example, node 1330 includes interface controller 1334, which represents logic to control access by node 1330 to fabric 1370. The logic can include hardware resources to interconnect to the physical interconnection hardware. The logic can include software or firmware logic to manage the interconnection. In one example, interface controller 1334 is or includes a host fabric interface, which can be a fabric interface in accordance with any example described herein.

Processor 1332 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 1340 can be or include memory devices. Node 1330 includes a memory controller, represented by controller 1342, to manage access to memory 1340.

In one aspect, an apparatus for handling memory failure includes: a substrate; and a controller disposed on the substrate, the controller to detect an uncorrectable error (UE) in data from a memory device, correlate a hardware configuration of the memory device with historical data indicating memory faults for hardware elements of the hardware configuration to identify a faulty region of memory associated with the UE and mirror the faulty region at runtime to a reserved memory space of the memory device for access to the faulty region data.

In one example of the apparatus, the faulty region comprises a region of cacheline granularity. In accordance with any preceding example of the apparatus, in one example, the faulty region comprises multiple cachelines. In accordance with any preceding example of the apparatus, in one example, the reserved memory space comprises a sparing region, and wherein to mirror the faulty region comprises to write to the sparing region for write access and to check the sparing region for read access. In accordance with any preceding example of the apparatus, in one example, to mirror the faulty region to the sparing region comprises a lazy access, wherein the controller is to mirror the faulty region only in response to a write access request to the faulty region. In accordance with any preceding example of the apparatus, in one example, to mirror the faulty region to the sparing region comprises a proactive write, wherein the controller is to mirror the faulty region prior to a write access or read access request to the faulty region. In accordance with any preceding example of the apparatus, in one example, the controller comprises: a sparing directory to record a mapping of cachelines mirrored to the reserved memory space. In accordance with any preceding example of the apparatus, in one example, to correlate the hardware configuration with the historical data comprises the controller to monitor correctable errors (CEs) and uncorrectable errors (UEs) for the hardware elements of the hardware configuration. In accordance with any preceding example of the apparatus, in one example, the faulty region comprises one or more of a row of memory, a column of memory, or a bit of memory. In accordance with any preceding example of the apparatus, in one example, the substrate comprises a board of a dual inline memory module (DIMM), and wherein the controller comprises a controller of the DIMM. In accordance with any preceding example of the apparatus, in one example, the substrate comprises a motherboard, and wherein the controller comprises a controller on a motherboard. In accordance with any preceding example of the apparatus, in one example, the memory device comprises a dual inline memory module (DIMM) with multiple dynamic random access memory (DRAM) devices or a stacked memory with multiple DRAM chips in a vertical stack.

In one aspect, a system for handling memory failure includes: a host hardware platform including a central processing unit (CPU) and multiple memory devices; and a controller coupled to the memory devices, the controller to detect an uncorrectable error (UE) in data from a memory device, correlate a hardware configuration of the memory device with historical data indicating memory faults for hardware elements of the hardware configuration to identify a faulty region of memory associated with the UE and mirror the faulty region at runtime to a reserved memory space of the memory device for access to the faulty region data.

In one example of the system, the faulty region comprises a region of cacheline granularity. In accordance with any preceding example of the system, in one example, the faulty region comprises a region of one or multiple cachelines. In accordance with any preceding example of the system, in one example, the reserved memory space comprises a sparing region, and wherein to mirror the faulty region comprises a lazy access, wherein the controller is to mirror the faulty region only in response to a write access request to the faulty region. In accordance with any preceding example of the system, in one example, the reserved memory space comprises a sparing region, and wherein to mirror the faulty region comprises a proactive access, wherein the controller is to mirror the faulty region prior to an access request. In accordance with any preceding example of the system, in one example, the faulty region comprises multiple cachelines. In accordance with any preceding example of the system, in one example, the reserved memory space comprises a sparing region, and wherein to mirror the faulty region comprises to write to the sparing region for write access and to check the sparing region for read access. In accordance with any preceding example of the system, in one example, to mirror the faulty region to the sparing region comprises a lazy access, wherein the controller is to mirror the faulty region only in response to a write access request to the faulty region. In accordance with any preceding example of the system, in one example, to mirror the faulty region to the sparing region comprises a proactive write, wherein the controller is to mirror the faulty region prior to a write access or read access request to the faulty region. In accordance with any preceding example of the system, in one example, the controller comprises: a sparing directory to record a mapping of cachelines mirrored to the reserved memory space. In accordance with any preceding example of the system, in one example, to correlate the hardware configuration with the historical data comprises the controller to monitor correctable errors (CEs) and uncorrectable errors (UEs) for the hardware elements of the hardware configuration. In accordance with any preceding example of the system, in one example, the faulty region comprises one or more of a row of memory, a column of memory, or a bit of memory. In accordance with any preceding example of the system, in one example, the substrate comprises a board of a dual inline memory module (DIMM), and wherein the controller comprises a controller of the DIMM. In accordance with any preceding example of the system, in one example, the substrate comprises a motherboard, and wherein the controller comprises a controller on a motherboard. In accordance with any preceding example of the system, in one example, the memory device comprises a dual inline memory module (DIMM) with multiple dynamic random access memory (DRAM) devices or a stacked memory with multiple DRAM chips in a vertical stack. In accordance with any preceding example of the system, in one example, the system includes one or more of: a display communicatively coupled to the CPU; a network interface communicatively coupled to a host processor; or a battery to power the system.

In one aspect, a method for handling memory failure includes: correlating a hardware configuration of a memory device with historical data indicating memory faults for hardware elements of the hardware configuration to identify a faulty region of memory associated with a detected error; and mirroring the faulty region at runtime to a reserved memory space of the memory device for access to data of the faulty region.

In one example of the method, the faulty region comprises a region of one or multiple cachelines. In accordance with any preceding example of the method, in one example, the reserved memory space comprises a sparing region, and wherein mirroring the faulty region comprises performing a lazy access, to mirror the faulty region only in response to a write access request to the faulty region. In accordance with any preceding example of the method, in one example, the reserved memory space comprises a sparing region, and wherein mirroring the faulty region comprises performing a proactive access, to mirror the faulty region prior to an access request. In accordance with any preceding example of the method, in one example, the method includes: storing a mapping of cachelines mirrored to the reserved memory space in a sparing directory.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus for handling memory failure, comprising:
a substrate; and
a controller disposed on the substrate, the controller to detect an uncorrectable error (UE) in data from a memory device, correlate a hardware configuration of the memory device with historical data indicating memory faults for hardware elements of the hardware configuration to identify a faulty region of memory associated with the UE and mirror the faulty region at runtime to a reserved memory space of the memory device for access to data of the faulty region, wherein the controller is to mirror the faulty region only in response to a write access request to the faulty region.

2. The apparatus of claim 1, wherein the faulty region comprises a region of cacheline granularity.

3. The apparatus of claim 2, wherein the faulty region comprises multiple cachelines.

4. The apparatus of claim 1, wherein the reserved memory space comprises a sparing region, and wherein to mirror the faulty region comprises to write to the sparing region for write access and to check the sparing region for read access.

5. The apparatus of claim 1, wherein the controller comprises:
a sparing directory to record a mapping of cachelines mirrored to the reserved memory space.

6. The apparatus of claim 1, wherein to correlate the hardware configuration with the historical data comprises the controller to monitor correctable errors (CEs) and uncorrectable errors (UEs) for the hardware elements of the hardware configuration.

7. The apparatus of claim 1, wherein the faulty region comprises one or more of a row of memory, a column of memory, or a bit of memory.

8. The apparatus of claim 1, wherein the substrate comprises a board of a dual inline memory module (DIMM), and wherein the controller comprises a controller of the DIMM.

9. The apparatus of claim 1, wherein the substrate comprises a motherboard, and wherein the controller comprises a controller on a motherboard.

10. The apparatus of claim 1, wherein the memory device comprises a dual inline memory module (DIMM) with multiple dynamic random access memory (DRAM) devices or a stacked memory with multiple DRAM chips in a vertical stack.

11. A system for handling memory failure, comprising:
a host hardware platform including a central processing unit (CPU) and multiple memory devices; and
a controller coupled to the memory devices, the controller to detect an uncorrectable error (UE) in data from a memory device, correlate a hardware configuration of the memory device with historical data indicating memory faults for hardware elements of the hardware configuration to identify a faulty region of memory associated with the UE and mirror the faulty region at runtime to a reserved memory space of the memory device for access to data of the faulty region, wherein the controller is to mirror the faulty region only in response to a write access request to the faulty region.

12. The system of claim 11, wherein the faulty region comprises a region of one or multiple cachelines.

13. The system of claim 11, further comprising one or more of:
a display communicatively coupled to the CPU;
a network interface communicatively coupled to a host processor; or
a battery to power the system.

14. A method for handling memory failure, comprising:
correlating a hardware configuration of a memory device with historical data indicating memory faults for hardware elements of the hardware configuration to identify a faulty region of memory associated with a detected error; and
mirroring the faulty region at runtime to a reserved memory space of the memory device for access to data of the faulty region, wherein mirroring the faulty region comprises mirroring only in response to a write access request to the faulty region.

15. The method of claim 14, wherein the faulty region comprises a region of one or multiple cachelines.

16. The method of claim 14, further comprising:
storing a mapping of cachelines mirrored to the reserved memory space in a sparing directory.

* * * * *